United States Patent [19]

Kawahigashi et al.

[11] Patent Number: 5,051,988

[45] Date of Patent: Sep. 24, 1991

[54] TRANSMISSION LINE ENCODING/DECODING SYSTEM

[75] Inventors: Haruko Kawahigashi; Shuji Ito; Takane Kakuno; Sakae Nakano; Mikio Yoshioka, all of Kanagawa, Japan

[73] Assignee: Mitsubishi Denki Kabushiki Kaisha, Tokyo, Japan

[21] Appl. No.: 429,302

[22] Filed: Oct. 30, 1989

[30] Foreign Application Priority Data

Nov. 2, 1988 [JP] Japan .............................. 63-277791
Mar. 9, 1989 [JP] Japan .................................. 1-56962
Mar. 15, 1989 [JP] Japan .................................. 1-62391

[51] Int. Cl.$^5$ .............................................. H04J 3/12
[52] U.S. Cl. ..................................... 370/99; 370/110.1
[58] Field of Search ................... 370/99, 100.1, 102, 370/105.2, 105.4, 110.1

[56] References Cited

U.S. PATENT DOCUMENTS

| | | | |
|---|---|---|---|
| 4,742,531 | 5/1988 | Blondeau, Jr. et al. | 375/25 |
| 4,747,098 | 5/1988 | Huang et al. | 370/99 |
| 4,757,500 | 7/1988 | Gorshe | 370/99 |
| 4,757,501 | 7/1988 | Gorshe | 370/99 |

Primary Examiner—Douglas W. Olms
Assistant Examiner—Melvin Marcelo
Attorney, Agent, or Firm—Wolf, Greenfield & Sacks

[57] ABSTRACT

The present invention provides a transmission line encoding/decoding system wherein encoding is effected in such a manner that an overhead bit which indicates whether or not a slot, all the bits of which are "0" bits (hereinafter referred to as an all-"0" slot), is present among a plurality of slots constituting in combination one block and is set in a predetermined slot in the block, and if there are all-"0" slots, a slot information bit which indicates the slot position of at least one all-"0" slot is set and at least one all-"0" slot the position of which is indicated by the slot information bit is deleted, and wherein decoding is effected in such a manner that whether or not an all-"0" slot was present in one block before the encoding process is judged on the basis of an overhead bit set at a predetermined position in the block of the received data, and if it is judged that there was an all-"0" slot, the slot information bit indicating the slot position of the all-"0" slot that has been set in the received block is removed and an all-"0" slot is reconstructed at the position indicated by the slot information bit.

9 Claims, 28 Drawing Sheets

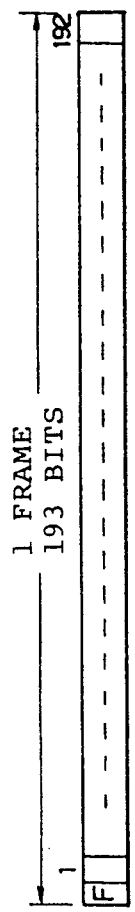
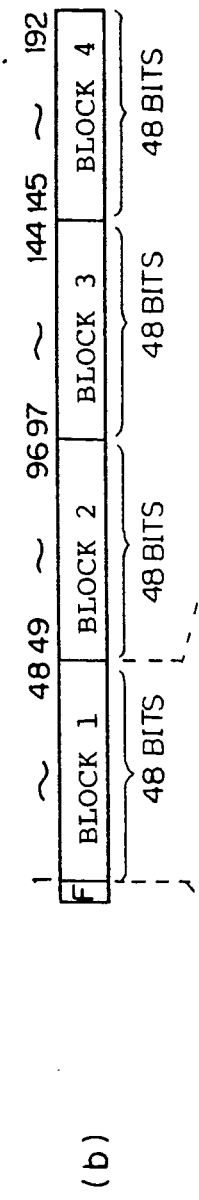
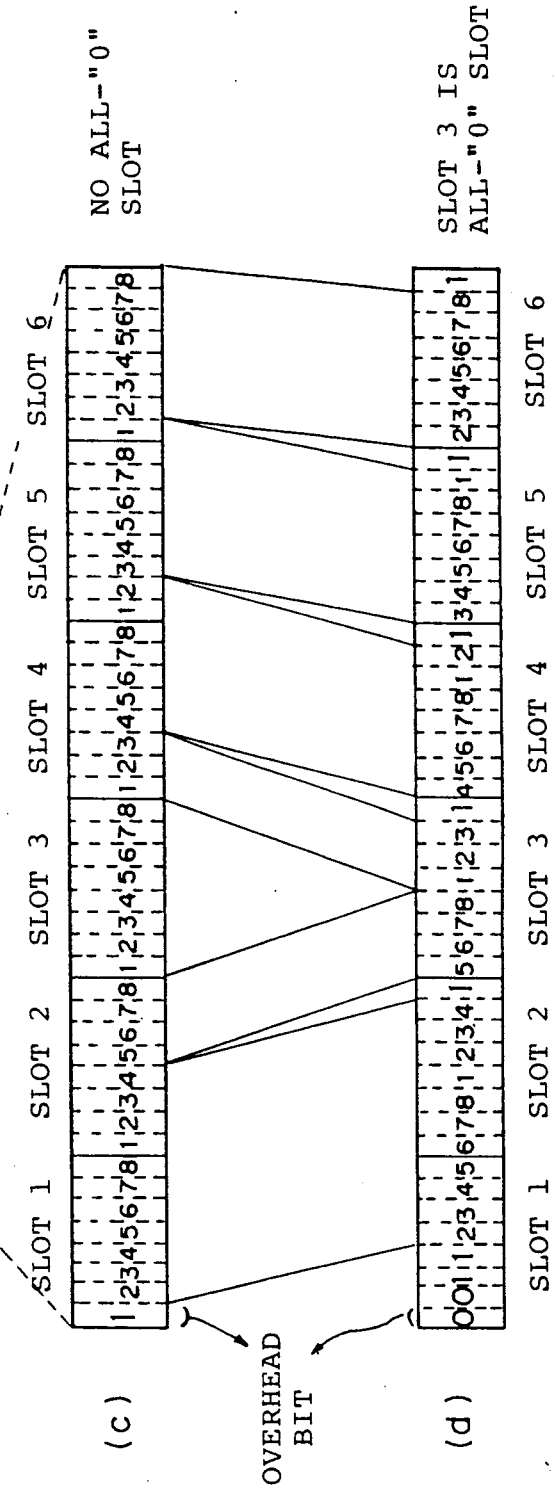
Fig. 3

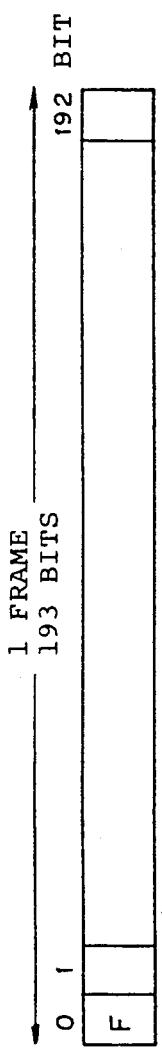
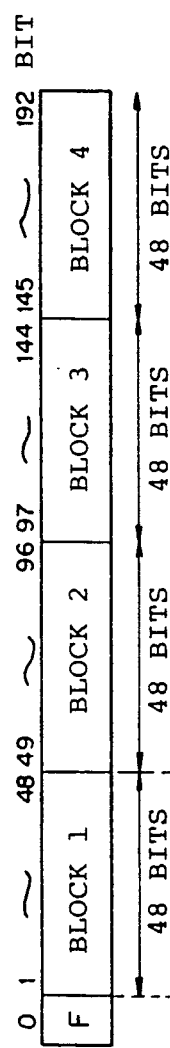
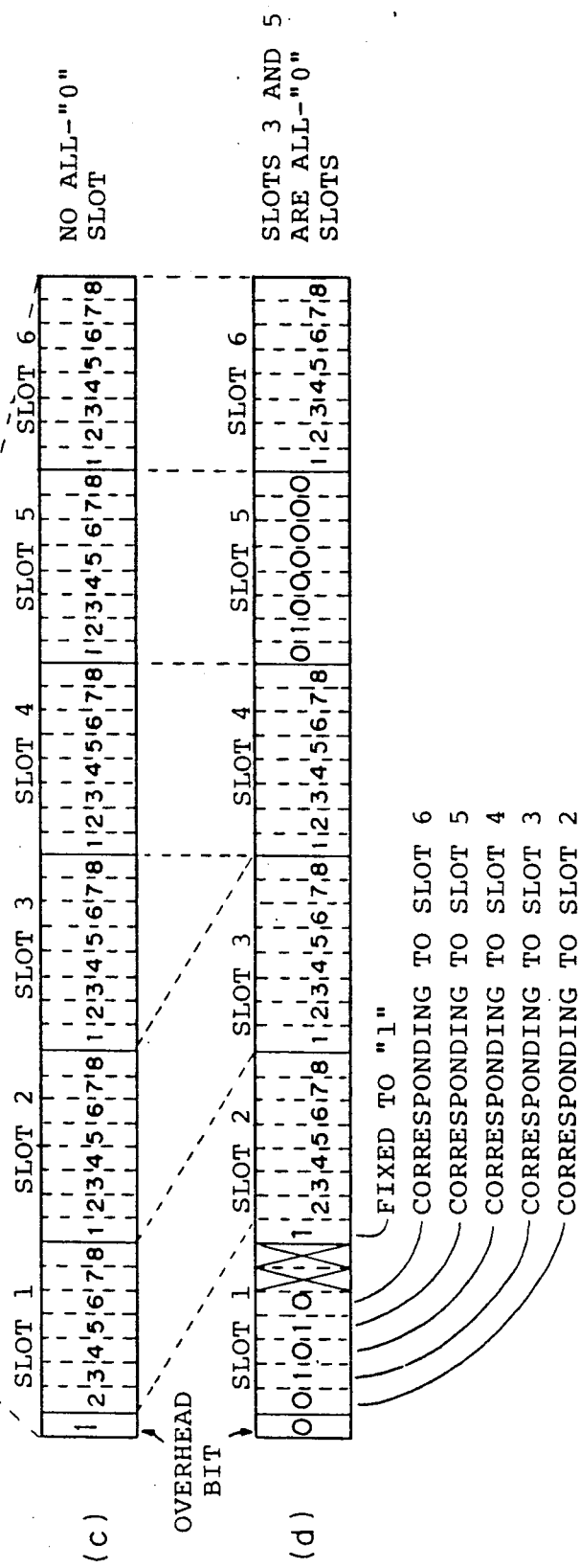
Fig. 9

Fig. 13

| BINARY CODES | SLOT 2 | SLOT 3 | SLOT 4 | SLOT 5 | SLOT 6 | | | |
|---|---|---|---|---|---|---|---|---|
| 0 0 0 0 1 | ALL-"0" SLOT | ALL-"0" SLOT | ALL-"0" SLOT | ALL-"0" SLOT | ALL-"0" SLOT | --- | | |
| 0 0 0 1 0 | NON-ALL-"0" SLOT | ALL-"0" SLOT | ALL-"0" SLOT | ALL-"0" SLOT | ALL-"0" SLOT | --- | | |
| 0 0 0 1 1 | ALL-"0" SLOT | NON-ALL-"0" SLOT | ALL-"0" SLOT | ALL-"0" SLOT | ALL-"0" SLOT | --- | | |
| --- | --- | --- | --- | --- | --- | --- | | |
| 1 1 1 1 0 | NON-ALL-"0" SLOT | NON-ALL-"0" SLOT | NON-ALL-"0" SLOT | ALL-"0" SLOT | NON-ALL-"0" SLOT | | | |
| 1 1 1 1 1 | NON-ALL-"0" SLOT | NON-ALL-"0" SLOT | NON-ALL-"0" SLOT | NON-ALL-"0" SLOT | ALL-"0" SLOT | | | |

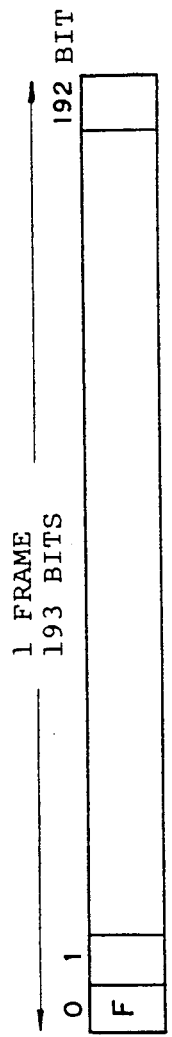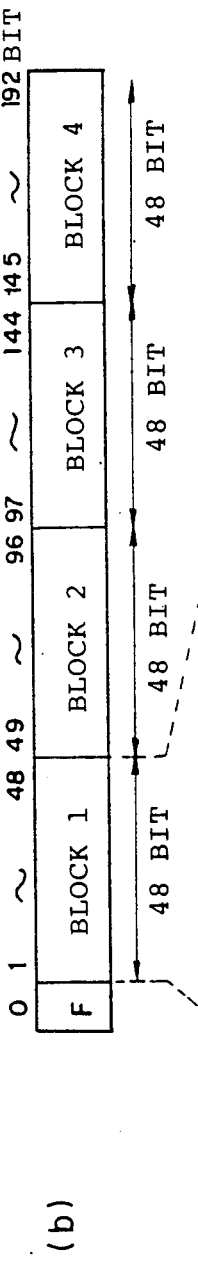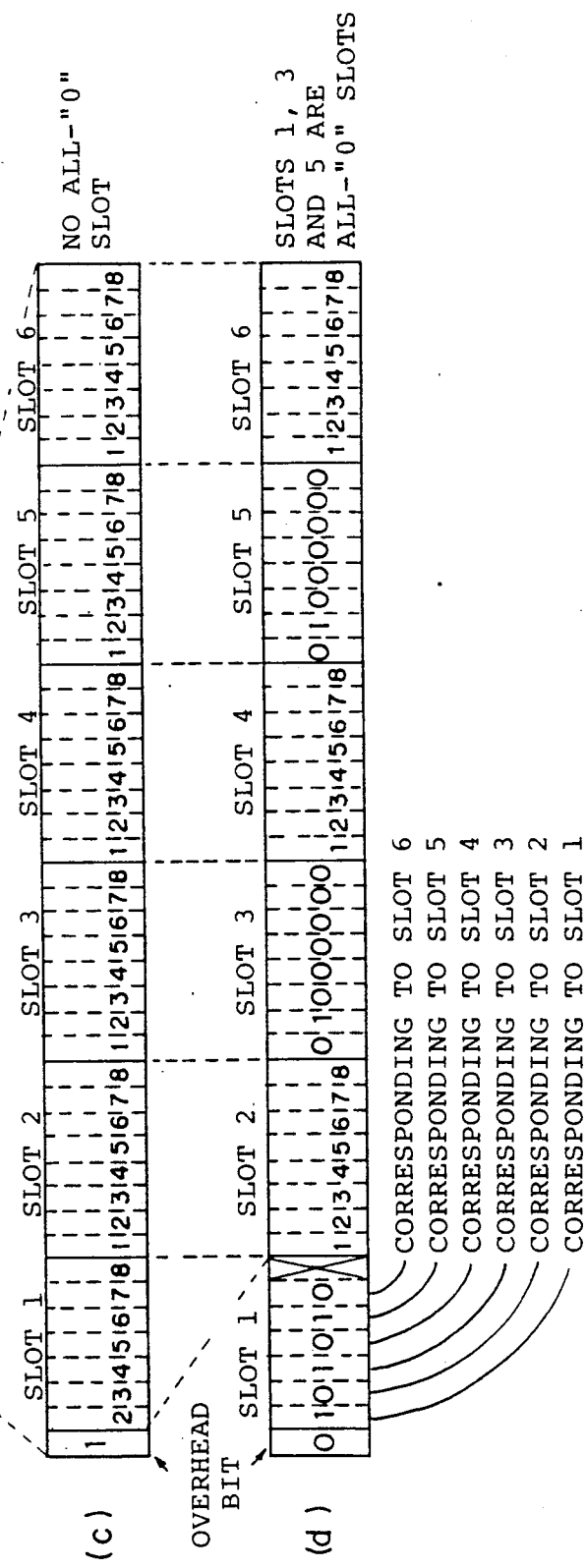

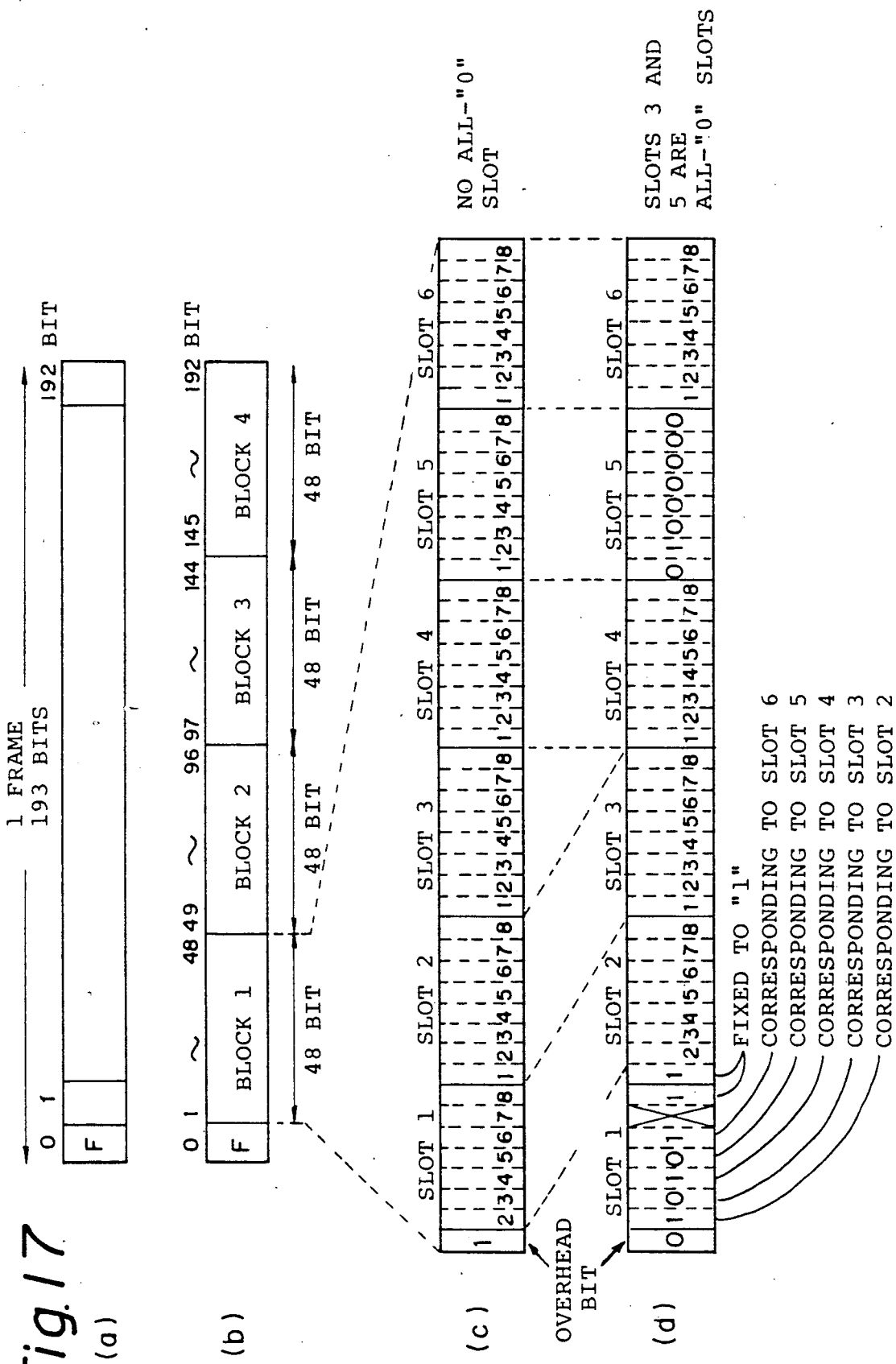

Fig. 23(a)

| BINARY CODES | | | CORRESPONDING SLOTS |
|---|---|---|---|
| 0 | 1 | 0 | SLOT 2 |
| 0 | 1 | 1 | SLOT 3 |
| 1 | 0 | 0 | SLOT 4 |
| 1 | 0 | 1 | SLOT 5 |
| 1 | 1 | 0 | SLOT 6 |

Fig. 23(b)

| BINARY CODES | | | CORRESPONDING SLOTS |
|---|---|---|---|
| 1 | 0 | 0 | SLOT 2 |
| 0 | 1 | 0 | SLOT 3 |
| 1 | 1 | 0 | SLOT 4 |
| 0 | 0 | 1 | SLOT 5 |
| 1 | 0 | 1 | SLOT 6 |

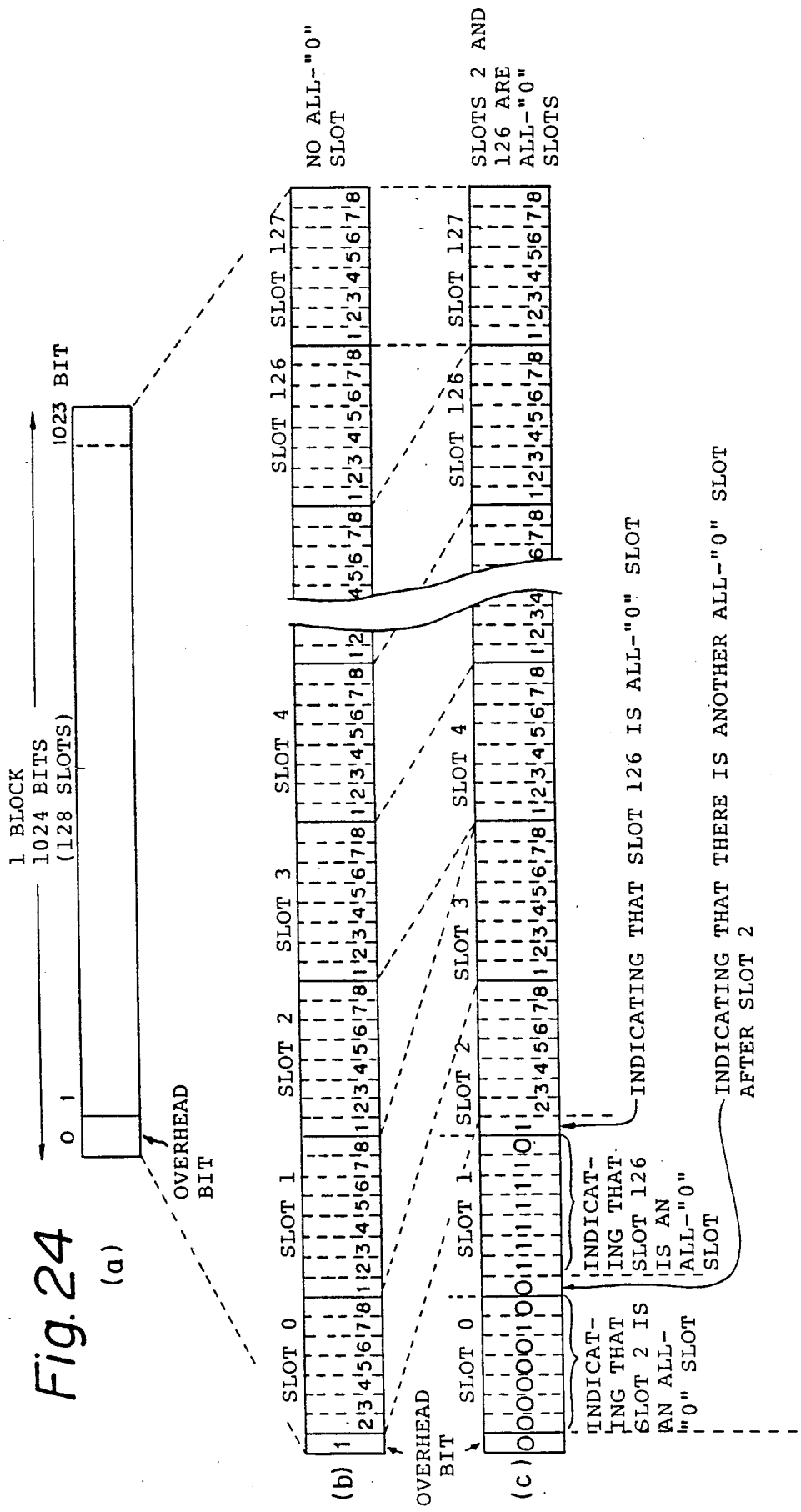

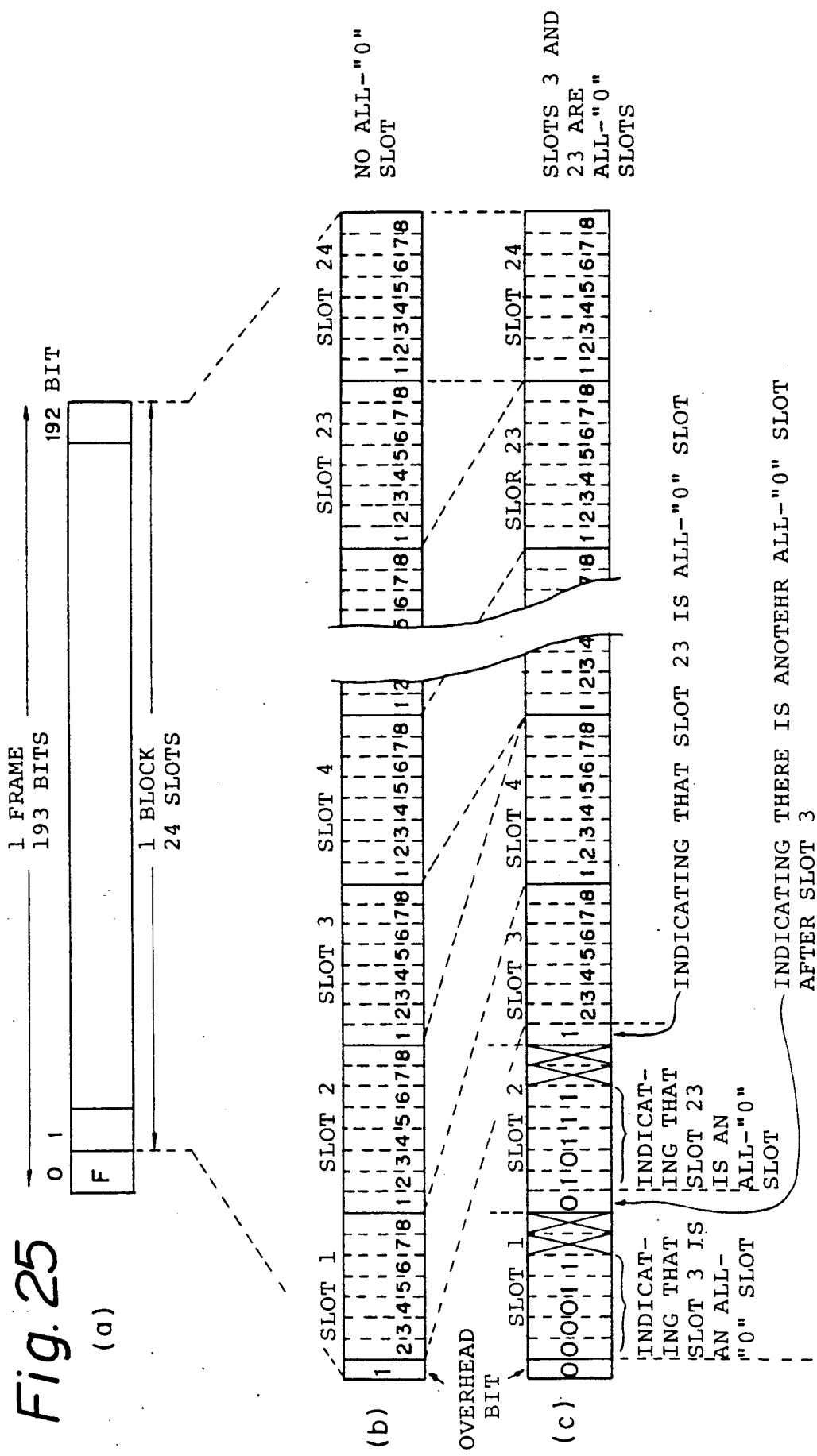

TRANSMISSION LINE ENCODING/DECODING SYSTEM

BACKGROUND OF THE INVENTION

1. Field of the Invention

The present invention relates to a transmission line encoding/decoding system for preventing more than a predetermined number of "0" bits from appearing in series in digital data delivered to a transmission line.

2. Description of the Prior Art

In a communication system of the type in which timing information is extracted from digital data received from a transmission line to set an operating clock on the basis of the timing information thus obtained, if an excess number of "0" bits appear in series in the data received from the transmission line, timing information cannot be extracted at the receiving side and it is therefore necessary to limit the number of "0" bits delivered in series at the transmitting side. For instance, AT&T Publication 62411, U.S.A., specifies the state of a series of "0" bits as follows:

(1) a series of 16 or more "0" bits must not be delivered (2) at least n "1" bits must be contained in a range of $8 \times (n+1)$ bits at any time (n=1 to 23)

Under these circumstances, it has heretofore been common practice to prevent transmission of an excess number of "0" bits in series by use of a technique known as bit-7 stuffing, such as that shown in the application note (Document No. 29300N23, Order No. 323, September 1986) of LSIR8070 manufactured by Rockwell. According to the bit-7 stuffing technique, data to be transmitted is monitored for each slot (1 slot=8 bits), and when all the data bits in a slot are "0", the 7th bit in the slot is forcibly set to "1" and the data is transmitted in this state, thereby satisfying the above-described limiting conditions. FIG. 28 illustrates the encoding process by the bit-7 stuffing technique, in which: FIG. 28(a) shows data to be transmitted which is in the pre-processing state, FIG. 28(b) shows a transmitting clock signal, and FIG. 28(c) shows data transmitted to the transmission line after the bit-7 stuffing processing. The data shown in FIG. 28(c) is transmitted in synchronism with the rise of the transmitting clock signal shown in FIG. 28(b). Each slot comprises 8 bits, and 24 slots constitute a combination 1 frame. A frame bit F is added to the top of each frame. FIG. 28 shows a part of the transmitted data, that is, from slot 23 in one frame to the top of slot 1 in the next frame. As will be clear from FIG. 28, the bit stuffing processing is conducted in such a manner that data to be transmitted which is in the pre-processing state is monitored for each slot, and if a slot contains at least one "1" bit, as in the case of slot 23, the slot is transmitted in this state, whereas, if all the bits of a slot are "0", as in the case of slot 24, the 7th bit B7 in the slot is forcibly changed to "1" to obtain the transmitted data as shown in FIG. 28(c), thereby satisfying the above-described conditions of limiting the number of "0" bits delivered in series.

The conventional transmission line encoding/decoding system suffers, however, from the following problems. In the prior art, when all the bits of any slot are "0", a predetermined bit is forcibly changed to "1" at the transmitting side, as described above, and therefore a slot in which a predetermined bit has been forcibly changed to "1" because all the original data bits were "0" has the same form as that of a slot in which only a predetermined bit is originally "1", so that it is impossible to discriminate these two slots from each other at the data receiving side, which results in a data error. Accordingly, it is necessary in order to realize transparent data transmission to reserve a predetermined bit in every slot for bit stuffing. In consequence, the actual data transmitting speed is lower than the rated transmitting speed of the transmission line. For example, if one slot comprises 8 bits, the data transmitting speed is limited to ⅞ of the transmitting speed of the transmission line, resulting in a lowering of the channel occupancy ratio.

SUMMARY OF THE INVENTION

In view of the above-described problems of the prior art, it is a primary object of the present invention to provide a transmission line encoding/decoding system which is capable of preventing a predetermined number of "0" bits from being transmitted in series without lowering the channel occupancy ratio.

To this end, the present invention provides a transmission line encoding/decoding system wherein encoding is effected in such a manner that an overhead bit which indicates whether or not a slot, all the bits of which are "0" bits (hereinafter referred to as an all-"0" slot), is present among a plurality of slots constituting in combination one block and is set in a predetermined slot in the block, and if there are all-"0" slots, a slot information bit which indicates the slot position of at least one all-"0" slot is set and at least one all-"0" slot the position of which is indicated by the slot information bit is deleted, and wherein decoding is effected in such a manner that whether or not an all-"0" slot was present in one block before the encoding process is judged on the basis of an overhead bit set at a predetermined position in the block of the received data, and if it is judged that there was an all-"0" slot, the slot information bit indicating the slot position of the all-"0" slot that has been set in the received block is removed and an all-"0" slot is reconstructed at the position indicated by the slot information bit.

Thus, in the present invention, whether or not an all-"0" slot is present among the slots constituting one block is indicated by an overhead bit, and if there is no all-"0" slot, transparent data transmission can be carried out with the data in the original state without any danger of an excess number of "0" bits being delivered in series. If there are all-"0" slots, a slot information bit which indicates the slot position of at least one all-"0" slot is set in place of the "0" bits thereof and the other all-"0" slots are properly replaced, thereby preventing transmission of an excess number of "0" bits in series. In addition, the position of an all-"0" slot before the encoding process, is indicated by the slot information bit and the all-"0" slot before the encoding process is reconstructed on the basis of the slot information bit. Therefore, it becomes possible to effect transparent data transmission simply by reserving one bit in a predetermined slot of one block and hence it is possible to carry out data transmission at a high channel occupancy ratio.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which:

FIG. 3 shows the arrangement of data encoded and decoded by the processing procedures according to the first embodiment;

FIG. 9 shows the arrangement of data encoded and decoded by the processing procedures according to the second embodiment;

FIGS. 10 to 17 show respectively the arrangements of data encoded and decoded in other application examples of the second embodiment;

FIGS. 21 to 27, including FIGS. 23(a) and 23(b) show respectively the arrangements of data encoded and decoded in other application examples of the third embodiment.

DESCRIPTION OF THE PREFERRED EMBODIMENTS

One embodiment of the present invention will be described below with reference to the accompanying drawings.

Figure 1:
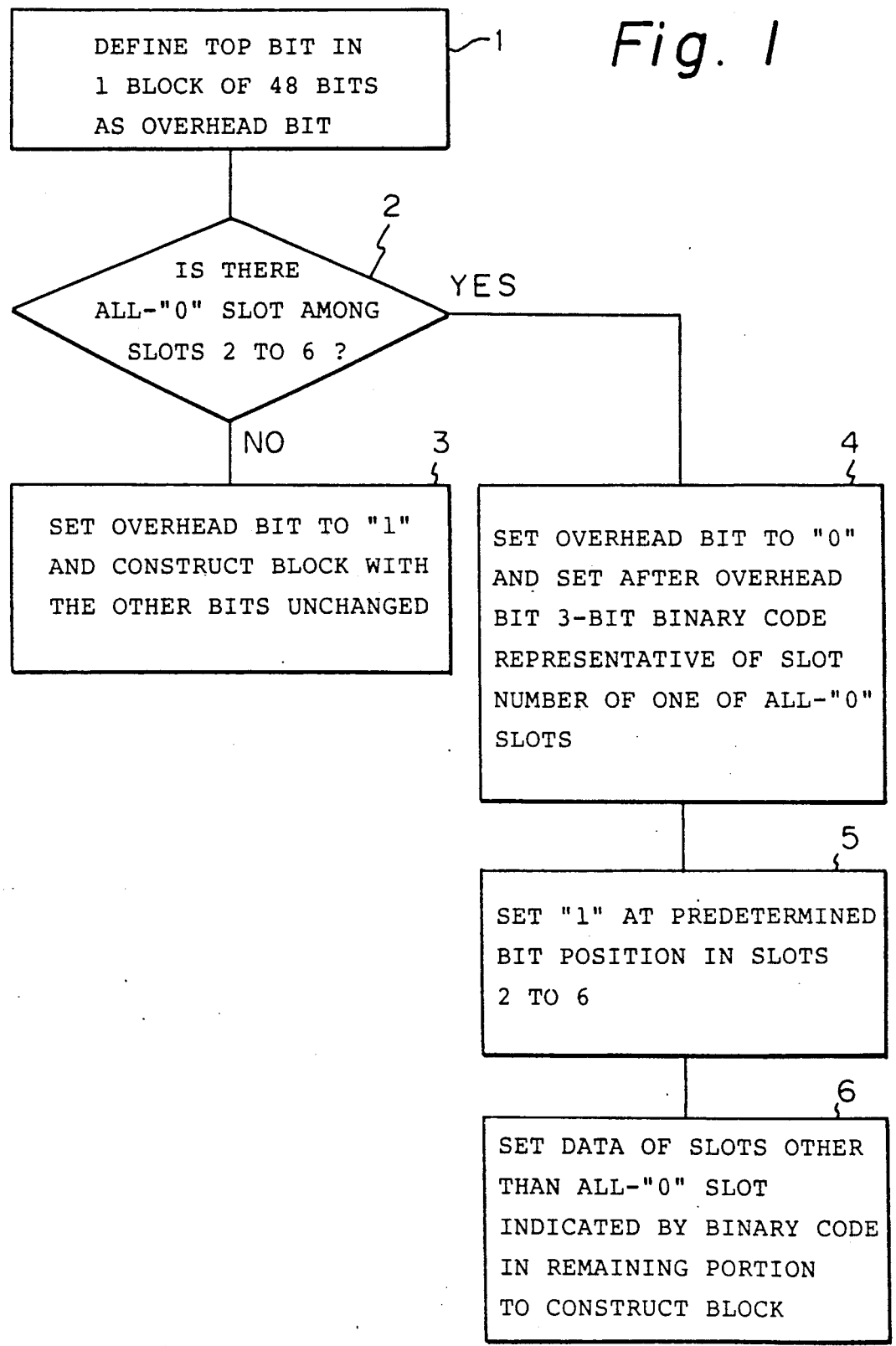
FIG. 1 is a flowchart showing the encoding procedure according to a first embodiment of the transmission line encoding/decoding system according to the present invention.
Figure 2:
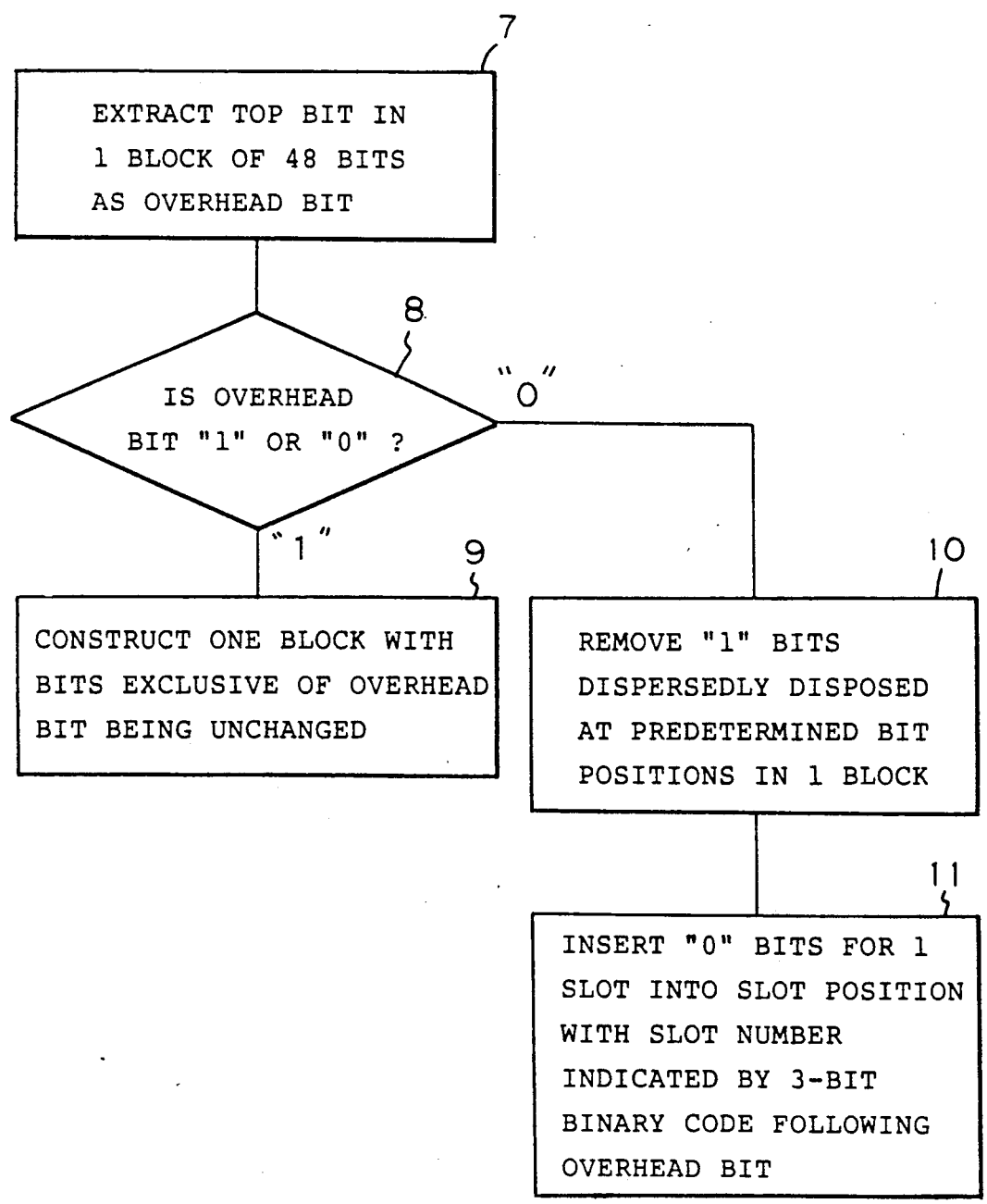
FIG. 2 is a flowchart showing the decoding procedure according to the first embodiment.

FIG. 1 is a flowchart showing the encoding procedure according to a first embodiment of the present invention in which data which is to be delivered to a transmission line is encoded so as to satisfy the conditions of limiting the number of "0" bits delivered in series, which are the same as those in the prior art, that is, (1) a series of 16 or more "0" bits must not be delivered and (2) at least n "1" bits must be contained in a range of $8\times(n+1)$ bits at any time, while FIG. 2 is a flowchart showing the decoding procedure according to the first embodiment, and FIG. 3 shows the arrangement of data encoded and decoded by these processing procedures. As shown in FIGS. 3(a) to 3(d), in the first embodiment one frame comprises one frame bit F and 192 data bits and the data bit section comprises 4 blocks, each block comprising 6 slots, and each slot comprising 8 bits.

The encoding procedure will first be explained with reference to the flowchart shown in FIG. 1. First, the data bits (192 bits) of one frame are equally divided into four blocks each comprising 48 bits, that is, the block 1 comprising the 1st to 48th bits, block 2 comprising the 49th to 96th bits, block 3 comprising the 97th to 144th bits and block 4 comprising the 145th to 192nd bits. The top bit in each block, that is, bit 1 in slot 1, is set as being an overhead bit (Step 1). Next, it is judged whether or not there is an all-"0" slot in which all the bits are "0" among the slots 2 to 6 (Step 2). If it is judged in Step 2 that there is no all-"0" slot, the overhead bit is set to "1", while the other bits are left unchanged, so as to construct one block as shown in FIG. 3(c). Thus, even if all the bits 2 to 8 in slot 1 are "0", since bit 1 is set to "1", all the bits of slot 1 will not be "0", and since there is no all-"0" slot among the slots 2 to 6, at least one "1" bit is inevitably contained in each slot of this block. Therefore, the above-described "0" series limiting conditions are satisfied, and since the data bits except for bit 1 in slot 1 are transmitted without being changed, there is no fear of a lowering in the channel occupancy ratio.

If it is judged in Step 2 that at least one all-"0" slot is present among the slots 2 to 6, the process proceeds to Step 4, in which the overhead bit is changed to "0" and then the binary code representative of the slot number of one of the all-"0" slots is set at the 3 bits that follow the overhead bit in slot 1. Then, in Step 5 "1" bits are set at predetermined bit positions (e.g., the last bit positions) in the slots 2 to 6, respectively, so that the "1" bits are dispersed throughout the block, and in Step 6 the data bits of the slots exclusive of the slot indicated by the binary code are successively set at the bit positions other than the "1" bits set in Step 5, the overhead bit and the binary code bits, thereby constructing one block. FIG. 3(d) shows the block arrangement in the case where slot 3 is an all-"0" slot, in which 3 bits that constitute a binary code "011" representative of the slot number of slot 3 are set so as to follow the overhead bit in slot 1, while "1" is set at the last bit in each of the slots 2 to 6, and the original data bits of the slots exclusive of slot 3 are successively set at the bit positions other than the "1" bits, the overhead bit and the binary code bits. More specifically, instead of delivering the 8 "0" bits of an all-"0" slot, 3 bits among them are replaced by 3 bits that constitute a binary code representative of the slot number of the all-"0" slot so that the receiving side is capable of exactly reconstructing the original data, i.e., the 8 "0" bits, at their original positions on the basis of the slot number. In addition, the 5 bits, that is, the result of the substraction of the 3 bits of the binary code from the 8 bits of the all-"0" slot, are replaced with "1" bits which are dispersedly disposed throughout the block. Thus, the data bits other than those of an all-"0" slot are successively transmitted, while the all-"0" slot is transmitted in the form of a binary code representative of the position thereof, and therefore data transmission is effected without lowering the channel occupancy ratio. In addition, it is possible to prevent all the data bits of slot 1 from being "0" by the presence of the binary code, while the data bits of the slots 2 to 6 are prevented from being all "0" by "1" set at the last bit in each slot. Thus, it is possible to satisfy the above-described conditions of limiting the number of "0" bits delivered in series.

With this encoding process, it is possible to effect completely transparent data transmission of the slots other than a slot including an overhead bit while satisfying limiting conditions concerning "0" bits delivered in series.

The decoding procedure will next be explained with reference to the flowchart shown in FIG. 2. The top bit in one block (48 bits) received is extracted as being an overhead bit in Step 7, and it is judged in Step 8 whether the overhead bit is "1" or "0". If "1" is the answer, it means that there was no all-"0" slot in the block before it was encoded. Therefore, all the bits except for the overhead bit are used without being changed to construct one block in Step 9. If the overhead bit is judged to be "0" in Step 8, it means that there was at least one all-"0" slot in the block before it was encoded. In such a case, the "1"s that have been dispersedly disposed at the respective positions in the block received are removed in Step 10. Then, the 3 bits following the overhead bit are interpreted as a binary code representative of a slot number and "0" bits for one slot are inserted into the slot position indicated by the slot number to reconstruct the original all-"0" slot in Step 11, thus effecting decoding.

Figure 4:
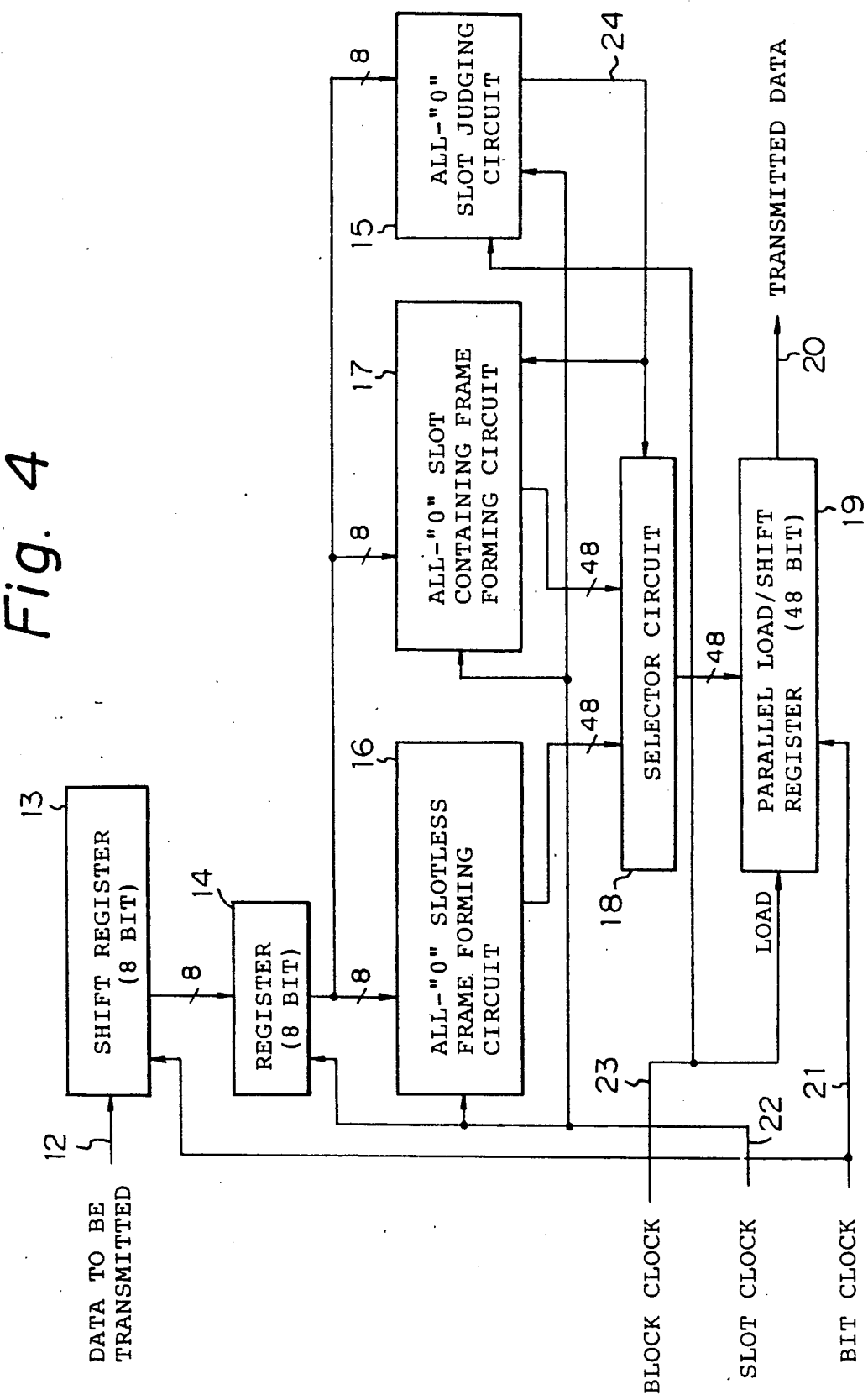
FIG. 4 is a block diagram of an encoder, which shows one example in which the present invention is carried out in the form of an electric circuit.
Figure 5:
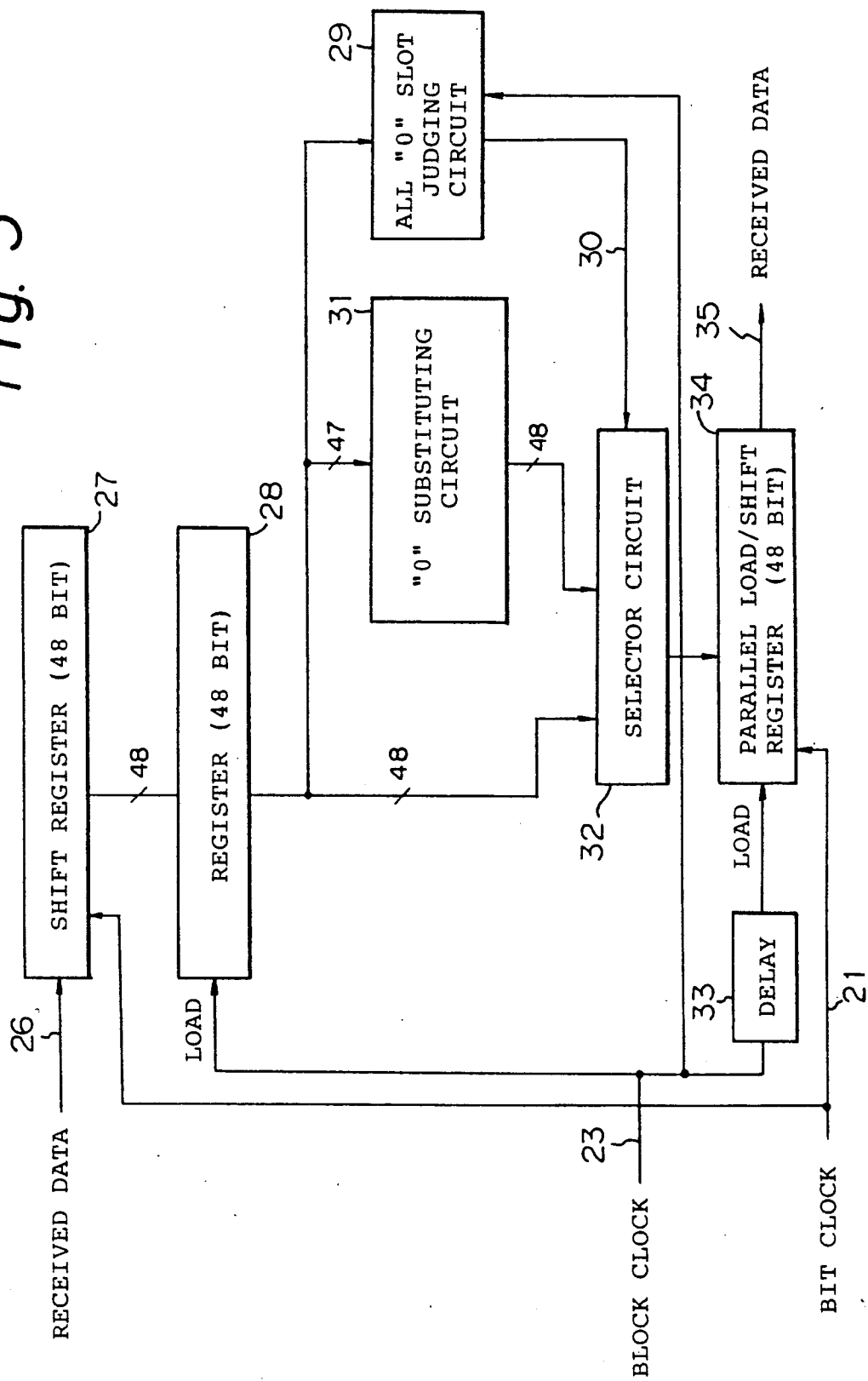
FIG. 5 is a block diagram of a decoder in the example wherein the present invention is carried out in the form of an electric circuit.

FIG. 4 is a block diagram of an encoder, which shows one example in which the transmission line encoding/decoding system of the present invention is realized in the form of an electrical circuit, and FIG. 5 is a block diagram of the decoder in the example. Referring to FIG. 4, the reference numeral 12 denotes data to be transmitted which is subjected to the transmission line encoding processing, 13 a shift register which shifts bitwise the data 12 to form and output a slot comprising 8 bits, 14 an 8-bit register which stores the output from the shift register 13 in units of slots in parallel, 15 an all-"0" slot judging circuit which judges whether or not all the 8 bits that are output from the register 14 at a time are "0", 16 an all-"0" slotless frame forming circuit which forms the output from the register 14 into a frame format that is used when there is no all-"0" slot, 17 an all-"0" slot containing frame forming circuit which forms the output from the register 14 into a frame format used when there is at least one all-"0" slot, 18 a selector circuit which selects either the output of the all-"0" slotless frame forming circuit 16 or the output of the all-"0" slot containing frame forming circuit 17 on the basis of the output from the all-"0" slot judging circuit 15, 19 a parallel load/shift register which loads the signals output from the selector circuit 18 in units of block and serially transmits the loaded signals, 20 the data encoded and output from the parallel load/shift register 19, that is, the transmitted data, 21 a bit clock which is output for each bit, 22 a slot clock which is output for each slot, and 23 a block clock which is output every 48 bits, which is the unit of code conversion. The reference numeral 24 denotes a signal output from the all-"0" slot judging circuit 15, which indicates whether or not there is at least one slot in which all the 8 bits are "0" among the slots in each block exclusive of slot 1. In FIG. 5, the reference numeral 26 denotes encoded data received from the transmission line, 27 a shift register which shifts the received data 26 by a number of bits corresponding to one block, that is, 48 bits, 28 a register which fetches the output from the shift register 27 in units of block, 29 an all-"0" slot judging circuit which fetches the top 1 bit of each block from the output of the register 28 to judge whether or not the block contains at least one all-"0" slot, 30 a signal output from the all-"0" slot judging circuit 30 which indicates that there is at least one all-"0" slot, 31 a "0" substituting circuit which substitutes, when there is at least one all-"0" slot, "0"s for all the data bits at the all-"0" slot position on the basis of the binary code set in the block and further removes "1" inserted into the last bit position in each slot, thereby restoring the encoded frame to the original form, 32 a selector circuit which selects either the output signal from the register 28 or the output signal from the "0" substituting circuit 31 on the basis of the output signal 30 from the all-"0" slot judging circuit 29, 33 a delay circuit which delays the block clock by several bits, 34 a parallel load/shift register which loads the output signal from the selector circuit 32 in units of block in response to the block clock 23 fed through the delay circuit 33 and outputs the loaded signal at the timing of the bit clock 21, and 35 the output from the parallel load/shift register 34, that is, the decoded received data.

Figure 6:
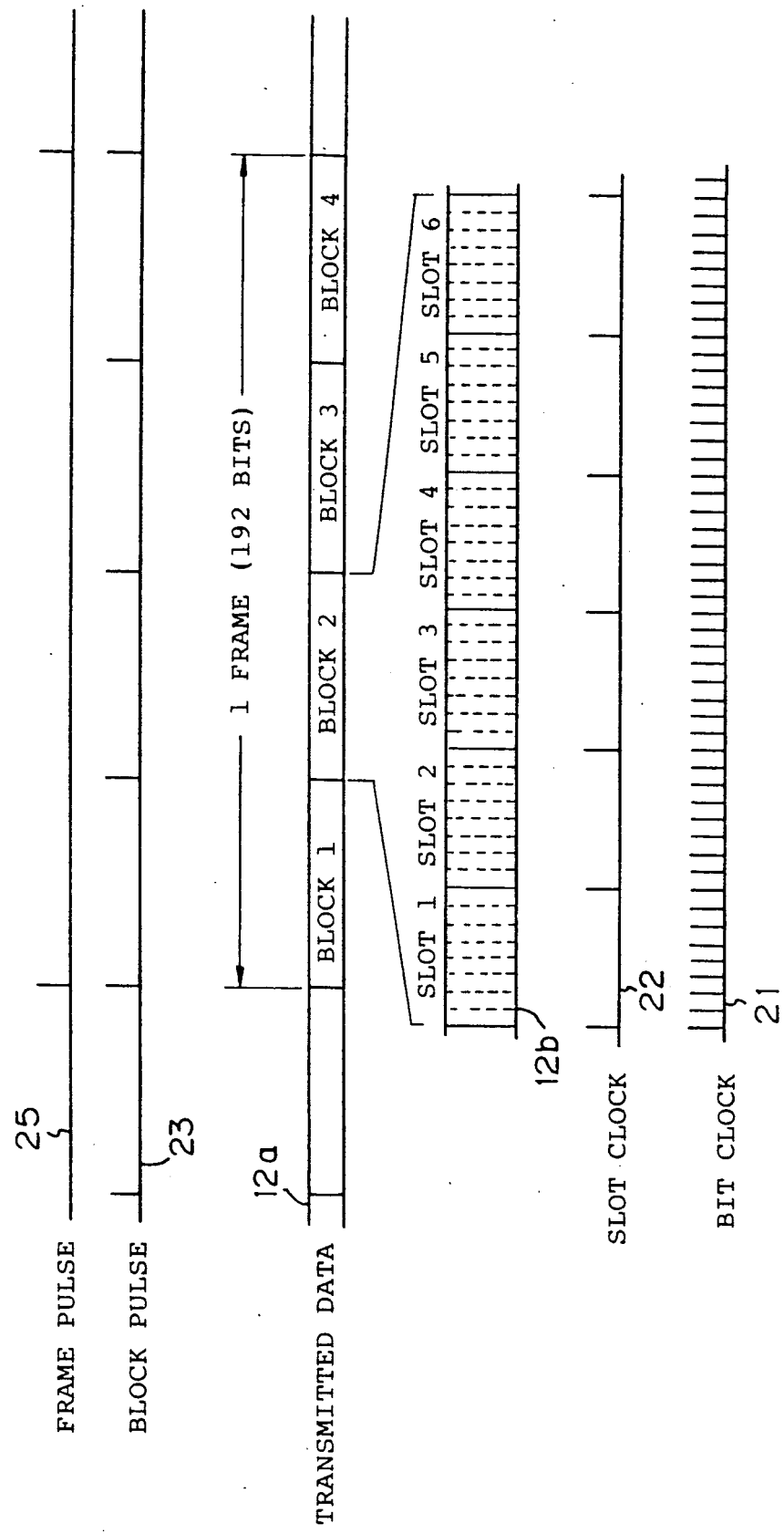
FIG. 6 is a time chart of various signals in the encoder shown in FIG. 4.

FIG. 6 is a timing chart showing the respective timings of the signals in the encoder shown in FIG. 4, in which the reference numeral 12b denotes one block of the data 12a to be transmitted, the block being shown in enlarged view, and the reference numeral 25 denotes frame pulses used to indicate the boundaries of a set of 192 bits.

The encoding operation of the transmission line encoding/decoding system having the above-described arrangement will first be explained. Referring to FIG. 4, the data to be transmitted 12 is converted into parallel signals in units of slot by the shift register 13 and the register 14. All the 8 bits of the output from the register 14 are fed into each of the following three circuits, that is, the all-"0" slotless frame forming circuit 16, the all-"0" slot containing frame forming circuit 17 and the all-"0" slot judging circuit 15. The all-"0" slotless frame forming circuit 16 sets the top bit in slot 1 to "1" and thereafter successively sets data bits in units of slot, thereby constructing a block, as shown in FIG. 3(c) which illustrates the block arrangement in the case where there is no all-"0" slot.

On the other hand, the all-"0" slot containing frame forming circuit 17 sets the top bit in slot 1 to "0" and further sets the last bit in each slot to "1", as shown in FIG. 3(d) which illustrates the block arrangement in the case where there is at least one all-"0" slot. Then, the circuit 17 successively fills the data output from the register 14 into the block from the 5th bit position in slot 1, as shown in FIG. 3(d), as long as it is not informed from the all-"0" slot judging circuit 15 that all the 8 bits constituting any of the slots 2 to 6 in each block are "0". If the output 24 from the all-"0" slot judging circuit 15 informs the circuit 17 that all the bits constituting a slot are "0", the circuit 17 is controlled so as to write a binary code representative of the slot number of the slot at the position of the 2nd to 4th bits in slot 1 but not write in the block the output from the register 14 all the data bits of which are "0", as shown in FIG. 3(d). After one all-"0" slot has been detected, the remaining data bits are successively written into the block irrespective of whether or not any of the remaining slots in the block is an all-"0" slot.

The all-"0" slot judging circuit 15 judges whether or not all the 8 bits stored in the register 14 are "0" for each of the slots 2 to 6 in each block. If there is at least one all-"0" slot among the slots 2 to 6 in each block, the all-"0" slot judging circuit 15 delivers the output 24 to inform both the all-"0" slot containing frame forming circuit 17 and the selector circuit 18 of the fact that there is an all-"0" slot.

The selector circuit 18 judges whether or not there is an all-"0" slot among the slots 2 to 6 in the block on the basis of the output signal 24 from the all-"0" slot judging circuit 15. If there is no all-"0" slot, the selector circuit 18 selects the output from the all-"0" slotless frame forming circuit 16, whereas, if there is an all-"0" slot, the selector circuit 18 selects the output from the all-"0" slot containing frame forming circuit 17, and the selector circuit 18 outputs the selected output to the parallel load/shift register 19.

The parallel load/shift register 19 fetches the output signal from the selector circuit 18 in response to the block clock 23 and transmits the encoded signal 20 at the timing of the bit clock 21. The block clock 23 resets the output of the all-"0" slot judging circuit 15 to prepare for the subsequent block.

Thus, in the encoder shown in FIG. 4, the input data 12 which is to be transmitted is fetched in units of slot, and a judgement as to whether or not all the data bits are "0" is made for each slot in the all-"0" slot judging circuit 15. The all-"0" slotless frame forming circuit 16 and the all-"0" slot containing frame forming circuit 17 respectively form frames on block-by-block basis for the two alternative cases. Either one of the outputs of the two frame forming circuits 16 and 17 is selected by the selector circuit 18 controlled by the output 24 from the all-"0" slot judging circuit 15 and delivered to the parallel load/shift register 19 in unit of blocks, where the output of the frame forming circuit 16 or 17 is converted into a serial form and the encoded signal is output as being transmitted data 20.

The decoding operation carried out in the decoder shown in FIG. 5 will next be explained. The received encoded data 26 is bitwise shifted in the shift register 27 and fed into the register 28 on block-by-block basis. The output from the register 28 is delivered to the selector circuit 32 and also to the "0" substituting circuit 31 and the all-"0" slot judging circuit 29. The "0" substituting circuit 31 interprets the contents of the 2nd to 4th bits in slot 1 of the block arrangement shown in FIG. 3(c) or 3(d) as a binary code representative of the slot number of an all-"0" slot and the circuit 31 sets all the data bits of the slot indicated by the slot number to "0" and further removes the "1" inserted into the last bit in each slot. On the other hand, the all-"0" slot judging circuit 29 fetches the top bit in each block to judge whether or not the block contains an all-"0" slot and informs the selector circuit 32 of the result of the judgement in the form of an output signal 30.

The selector circuit 32 makes selection on the basis of the output signal 30 such that, when there is no all-"0" slot in the block, it selects the output signal from the register 28, whereas, when there is an all-"0" slot in the block, the selector circuit 32 selects the decoded signal from the "0" substituting circuit 31. The output from the selector circuit 32 is fetched by the parallel load/shift register 34 at the timing determined by delaying the block clock 23 by several bits in the delay circuit 33. The fetched data is then output as being decoded received data 35 at the timing of the bit clock 21.

Thus, in the decoder shown in FIG. 5, the input received data 26 is fetched in units of block, and the fetched signal is decoded in the "0" substituting circuit 31 as being a block containing an all-"0" slot. The overhead bit at the top of the block is fed into the all-"0" slot judging circuit 29 to judge whether or not there is an all-"0" slot in the block. If there is no all-"0" slot, the output of the register 28 is selected, whereas, if there is an all-"0" slot, the output of the "0" substituting circuit 31 is selected, and the selected output is fed into the parallel load/shift register 34 and serially output therefrom, thus effecting decoding.

Although in the foregoing embodiment the 8th bit in each slot is defined as a position where "1" is inserted when there is an all-"0" slot, it should be noted that the bit position used for this purpose is not necessarily limited to the 8th bit and that it suffices to disperse "1" bits throughout the block so that the "0" series limiting conditions are satisfied in such the worst case where all the data bits are "0".

Thus, according to the first embodiment of the present invention, when there is an all-"0" slot in one block, the "0" bits of the all-"0" slot are replaced by a combination of a binary code representative of the slot number of the all-"0" slot which is set in the block and "1" bits which are dispersed throughout the block. Therefore, even if there is an all-"0" slot, the limiting conditions for a series of "0" bits are satisfied by the "1" bits dispersed throughout the block. In addition, the "0" bits of the all-"0" slot that are replaced by a plurality of "1" bits and that are not set in the block are decoded on the basis of the binary code. Accordingly, there is no danger that bits for data transmission will be lost because of the presence of the plurality of "1" bits, and it is therefore possible to prevent the lowering of the channel occupancy ratio in the data transmission.

The following is a description of a second embodiment of the present invention designed to satisfy the same limiting conditions as those described above. The encoding procedure will first be explained with reference to FIG. 7. Since the processings carried out in Steps 1 to 3 in the flowchart are the same as those in Steps 1 to 3 shown in FIG. 1, description thereof is omitted.

When it is judged in Step 2 that there is an all-"0" slot among the slots 2 to 6, the process proceeds to Step 4, in which the overhead bit is set to "0" and 5 bits which follow the overhead bit are arranged to correspond to slot information bits respectively indicating whether or not the corresponding slots 2 to 6 before the encoding process are all-"0" slots in such a manner that the bit corresponding to an all-"0" slot is set to "1", while the bit corresponding to a slot which is not an all-"0" slot is set to "0". The last two bits in slot 1 that follow these 5 bits may be set to either "1" or "0". Next, the top bit in slot 2, that is, the 8th bit from the overhead bit, is set to "1" and the bits 2 to 8 in slot 1 before the encoding process are inserted into the following 7 bits, respectively. Thus, since at least one of the slots 2 to 6 is inevitably an all-"0" slot, at least one of the 5 slot information bits following the overhead bit is "1"; therefore, there is not possibility that slot 1 after the encoding process will be an all-"0" slot. Since bit 1 in slot 2 after the encoding process is "1", there is no possibility that slot 2 after the encoding process will be an all-"0" slot even if all the bits 2 to 8 in slot 2 after the encoding process, that is, all the bits 2 to 8 in slot 1 before the encoding process, are "0".

Next, the first all-"0" slot among the all-"0" slots in the block is deleted and a predetermined bit in each of the following all-"0" slots is changed to "1" in Step 5.

Next, the data bits of the slots except for the one all-"0" slot deleted in Step 5 are successively set in the following slots 3 to 6 in Step 6, thereby constructing one block. This encoding process is carried out for each block to complete encoding of one frame.

FIG. 9(d) shows the block arrangement after the encoding process in the case where the slots 3 and 5 in the block before the encoding process are all-"0" slots. Since there are all-"0" slots in the block before the encoding process, the overhead bit in slot 1 is set to "0". The 5 bits that follow the overhead bit respectively indicate whether or not slots 2 to 6 are all-"0" slots, that is, the bits respectively corresponding to the slots 3 and 5 which are all-"0" slots, i.e., the bits 3 and 5 in slot 1, are set to "1", while the bits respectively corresponding to the slots 2, 4 and 6 which are not all-"0" slots, i.e., bits 2, 4 and 6 in slot 1, are set to "0". Bits 2 to 8 in slot 1 before the encoding process are [see FIG. 9(c)] are inserted into bits 2 to 8 in slot 2 after the encoding process [see FIG. 9(d)], and the top bit in slot 2 is set to "1". The data bits in slot 2 before the encoding process are inserted into slot 3 after the encoding process without being changed. Slot 3 that is the first all-"0" slot is deleted, and a predetermined bit among the 8 "0" bits in slot 5 that is the second all-"0" slot, that is, the 2nd bit in this example, is changed to "1". Slots 4, 5 and 6 before the encoding process are set in slots 4, 5 and 6, respectively, in the block after the encoding process. More specifically, instead of delivering the 8 "0" bits of the first all-"0" slot, five of the 8 bits are delivered as being slot information bits respectively corresponding to the second to sixth slots in the block to indicate whether or not each slot is an all-"0" slot, thereby enabling the receiving side to reconstruct the all-"0" slots before the encoding process. In addition, at least one bit of the 8 "0" bits in the all-"0" slots following the first all-"0" slot is replaced by "1", thereby preventing transmission of an excess number of "0" bits in series. It should be noted that the last 2 bits in slot 1 after the encoding process may be either "1" or "0".

By the above-described encoding process, the data bits other than those in all-"0" slots are delivered in series and the positions of all-"0" slots are indicated by slot information bits which are delivered in place of the first all-"0" slot in the block. Therefore, data transmission is carried out without lowering the channel occupancy ratio. In addition, the slots are prevented from being all-"0" slots by the following bits: slot 1 by the slot information bits; slot 2 by the "1" bit set at the 1st bit position; and the second and subsequent all-"0" slots among slots 3 to 6 by the "1" bits, respectively, which have replaced the "0" bits at predetermined positions. Thus, it is possible to satisfy the above-described "0" series limiting conditions.

According to the encoding process described above, it is necessary to provide only 1 overhead bit in one frame to satisfy the limiting conditions for "0" bits which are delivered in series and it is therefore possible according to the second embodiment to reduce the number of overheads to one sixth of that in the case of the conventional bit stuffing system.

Figure 8:
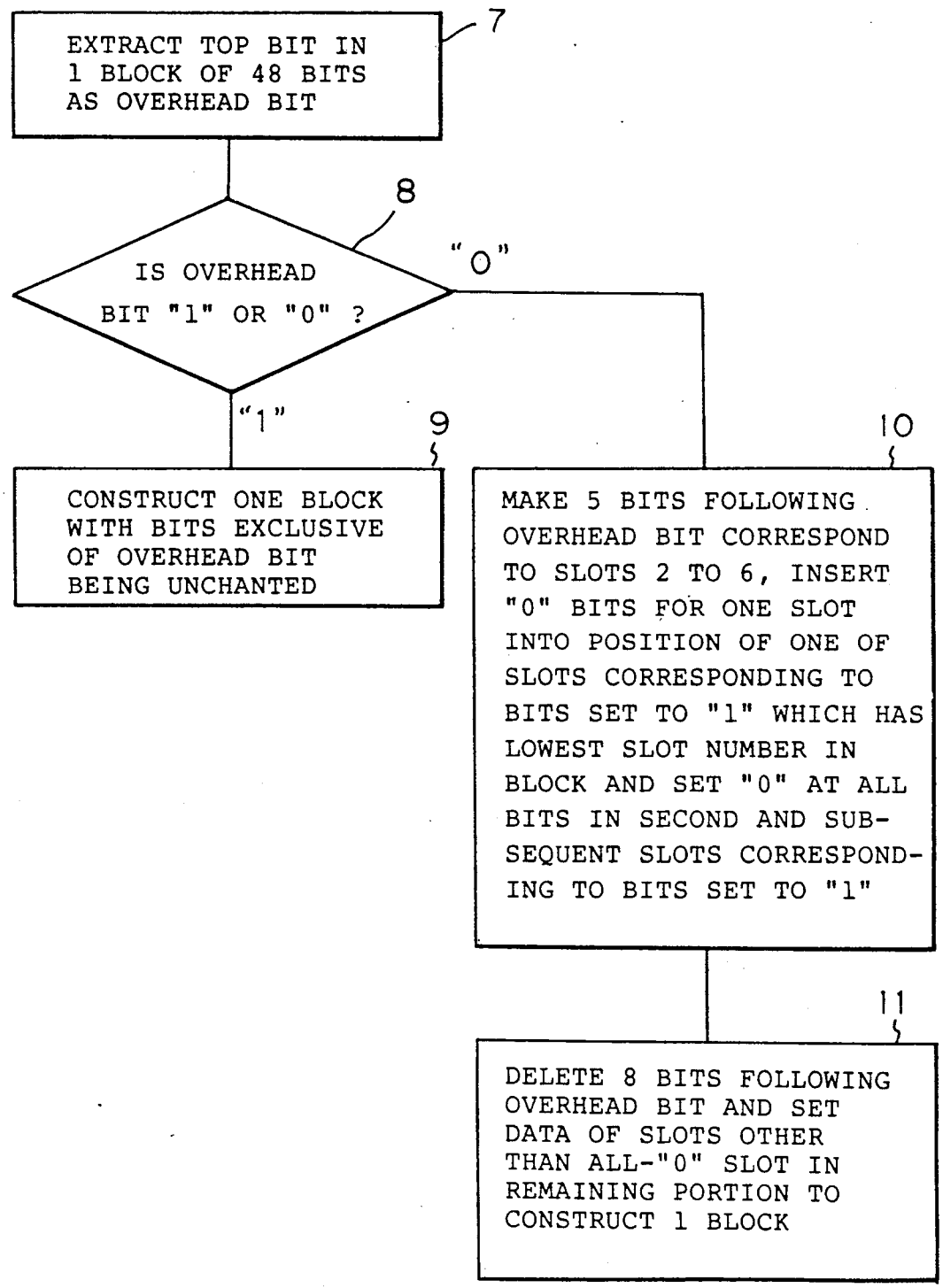
FIG. 8 is a flowchart showing the decoding procedure according to the second embodiment.

The decoding procedure will next be explained with reference to the flowchart shown in FIG. 8. First, the top bit in one block (48 bits) of the received data is extracted as being an overhead bit in Step 7, and it is judged in Step 8 whether the overhead bit is "1" or "0". If "1" is the answer, it means that there was no all-"0" slot in the block before the encoding process, and therefore the bits except for the overhead bit are used as data bits without being changed to construct one block in Step 9. If the overhead is judged to be "0" in Step 8, it means that there was at least one all-"0" slot in the block before the encoding, and the process proceeds to Step 10, in which the 5 bits following the overhead bit are extracted as being slot information bits respectively corresponding to the slots 2 to 6 and "0" bits for one slot are inserted into the position of the one of the slots corresponding to the slot information bits set to "1" that has the lowest slot number in the block and further all the bits in the second and subsequent slots whose corresponding slot information bits are set to "1" are set to "0". Next, the 8 bits following the overhead bit are deleted and the data bits of the slots exclusive of the all-"0" slots, that is, the slots whose corresponding slot information bits are set to "0", are set to the corresponding positions, respectively, in Step 11, thus effecting decoding. By this decoding process, slots each containing at least one "1" bit are delivered without being changed, while a "0" bit is inserted into an appropriate position in the one of the all-"0" slots that has the lowest slot number, and all the bits of the second and subsequent all-"0" slots are set to "0", thereby enabling each slot to be accurately reconstructed.

The encoder and decoder explained in connection with FIGS. 4 to 6 may be employed to realize the encoding and decoding systems of the second embodiment. However, the "0" substituting circuit 31 in the decoder shown in FIG. 5 inserts, when there is at least one all-"0" slot, "0" bits for one slot into the position of the first all-"0" slot in the block on the basis of the slot information bits set so as to follow the overhead bit in the block, sets all the bits of the slots corresponding to the second and subsequent all "0" slot positions to "0" and deletes the 8 bits following the overhead bit in the block received, thereby reconstructing the row of data before the encoding process.

The feature of the encoder according to the second embodiment resides in the operation of the all-"0" slot containing frame forming circuit 17. The circuit 17 sets the top bit in slot 1 to "0" and further sets bit 1 in the second slot to "1", as shown in FIG. 3(d) which illustrates the data arrangement of one block in the case where there is at least one all-"0" slot. Further, the circuit 17 arranges the 2nd to 6th bits in slot 1 so as to correspond to the slots 2 to 6, respectively, and sets either "0" or "1" in each of these bit positions on the basis of the output signal from the all-"0" slot judging circuit 15 in such a manner that, when all the 8 bits constituting a slot are "0", that is, when the slot concerned is an all-"0" slot, "1" is set, whereas, when the slot is not an all-"0" slot, "0" is set. Among the slots 2 to 6, a first all-"0" slot in the block is deleted, and for each of the second and subsequent all-"0" slots, the second bit in the 8 "0" bits constituting the all-"0" slot is set to "1". For slots which are not all-"0" slots, the data bits output from the register 14 are successively set in the input order without being changed, thus constructing one block.

The feature of the decoder according to the second embodiment resides in the operation of the "0" substituting circuit 31. The circuit 31, which decodes encoded data in the case where there is at least one all-"0" slot, such as that shown in FIG. 9(d), extracts a series of bits, i.e., from the 2nd bit of slot 1 to the 1st bit of slot 2 in each block, arranges the 2nd to 6th bits in slot 1 so as to correspond to the slots 2 to 6, respectively, inserts "0" bits for one slot into the position of the first slot among the slots whose corresponding bits have been set to "1", defines all the bits at the position of each slot whose corresponding bit has been set to "1" as "0" bits, and stuffs the original data into the position of a slot corresponding to the bit set to "0", thus effecting decoding of one block.

Figure 10:
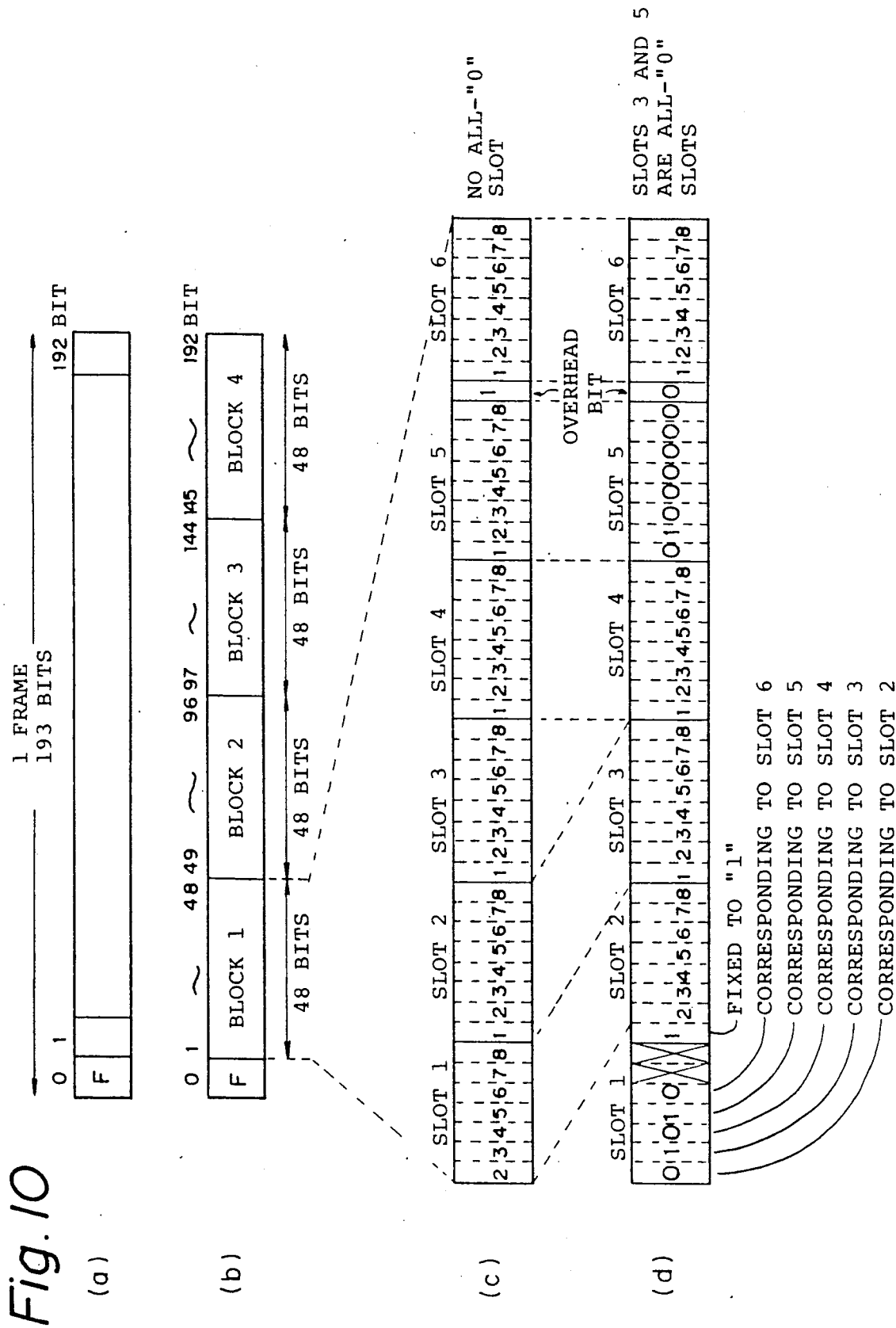

Although the overhead bit is disposed at the top of a 48-bit block as shown in FIGS. 9(c) and 9(d), it should be noted that the overhead bit may be provided at another position in the block. For example, the overhead bit may be disposed at the 8th bit position in slot 5, as shown in FIGS. 10(c) and 10(d).

Figure 11:
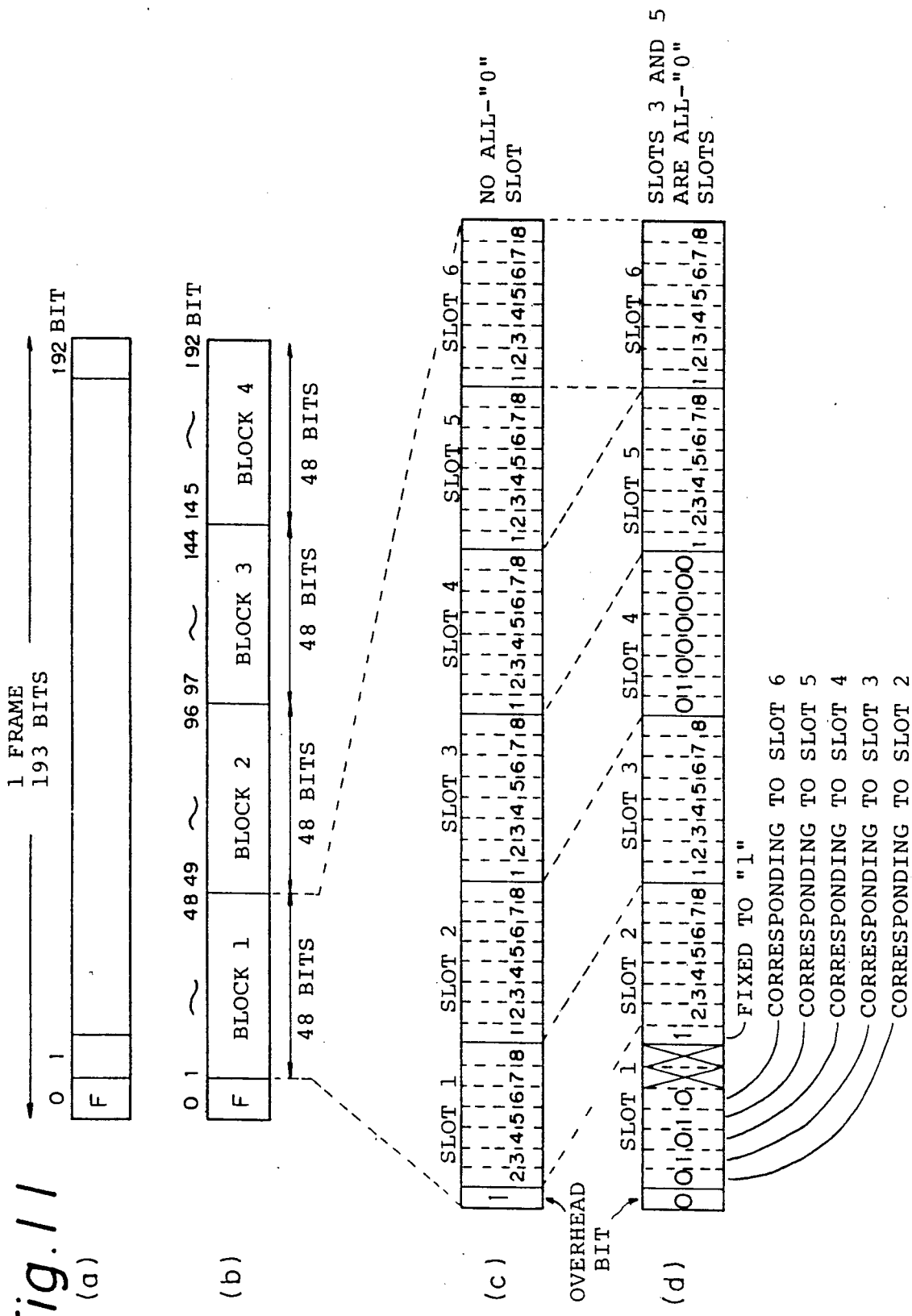
Figure 12:
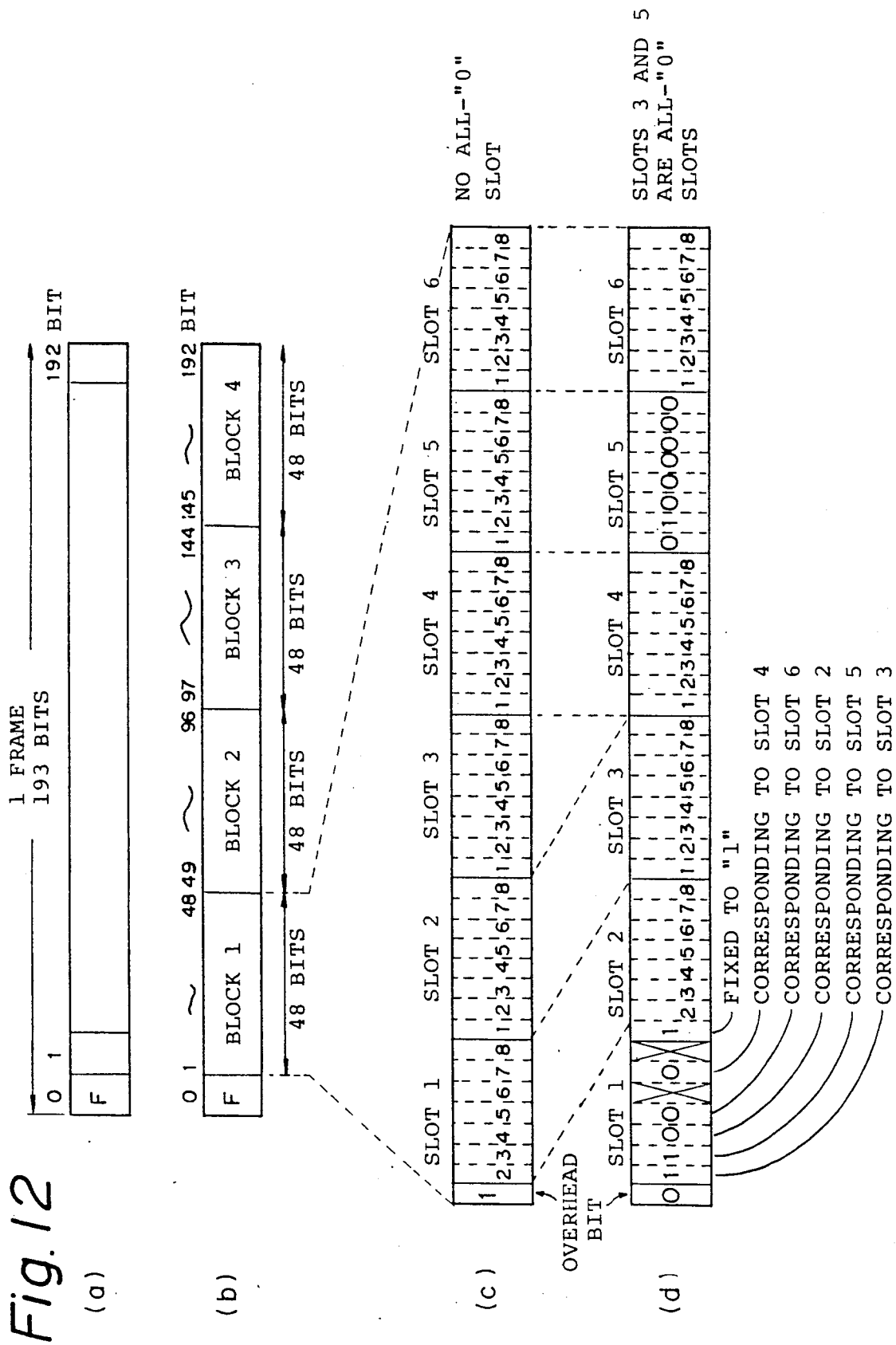

Although in the second embodiment the first all-"0" slot in the block is deleted and slot information bits are set in the block instead, the arrangement may be such that another all-"0" slot, for example, the second or last all-"0" slot, is deleted and slot information bits are set in the block instead. FIG. 11 shows the frame format in the case where the second all-"0" slot is deleted. Although in the second embodiment the 5 consecutive bits following the overhead bit are arranged to correspond to the slots 2 to 6, respectively, as shown in FIG. 9(d), other bits may be arranged to correspond to the slots 2 to 6, respectively, before the encoding process, as shown in FIG. 12(d).

In the second embodiment, the 5 slot information bits following the overhead bit are arranged to have a one-to-one correspondence to the slots 2 to 6, respectively, as shown in FIG. 9(d). However, the arrangement may be such that $2^5 - 1$ 5-bit binary codes obtained by subtracting a code all the bits of which are 0, i.e., (0, 0, 0, 0, 0), from $2^5$ 5-binary code are arranged to have a one-to-one correspondence to combinations of conditions as to whether or not each of the slots 2 to 6 is an all-"0" slot and these codes are defined as slot information bits, as exemplarily shown in FIG. 13.

Figure 14:
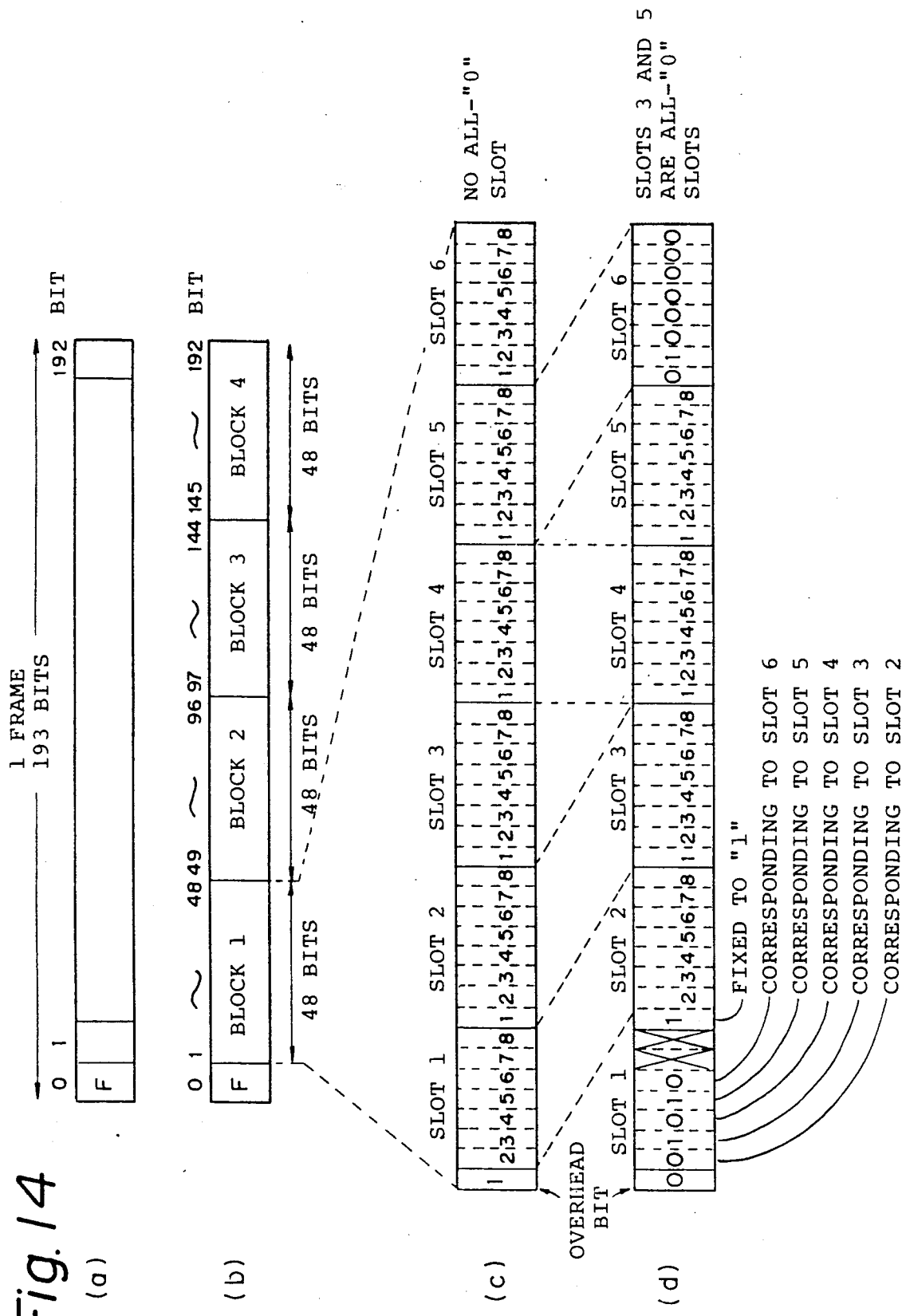

In the second embodiment, each of the second and subsequent all-"0" slots is disposed at the same position as in the case of the original slot with at least one of the 8 "0" bits thereof being changed to "1". However, each of the second and subsequent all-"0" slots may be disposed at another predetermined position, for example, at the last slot position in the block, as exemplarily shown in FIG. 14.

Figure 15:
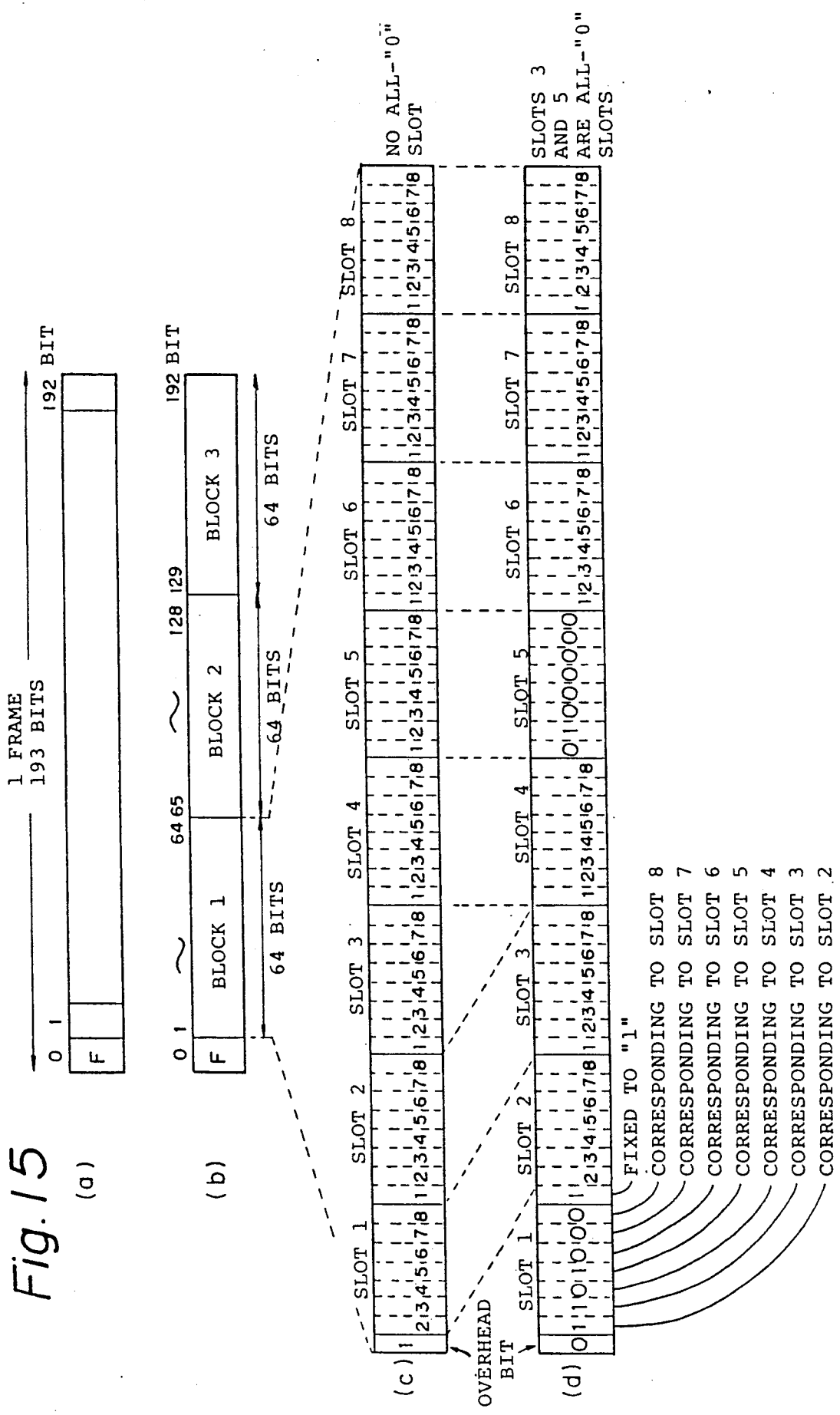

Although in the second embodiment one block comprises 48 bits, that is, 6 slots, as shown in FIG. 9, the transmission line encoding/decoding system of the present invention may, of course, be applied to the arrangement wherein one block comprises 64 bits, that is, 8 slots, as shown in FIG. 15. In this case, one frame comprises 3 blocks and therefore the number of overhead bits needed for one frame is three. Accordingly, it is possible to satisfy the above-described "0" series limiting conditions with a number of overhead bits which is smaller than in the case of the second embodiment.

Figure 7:
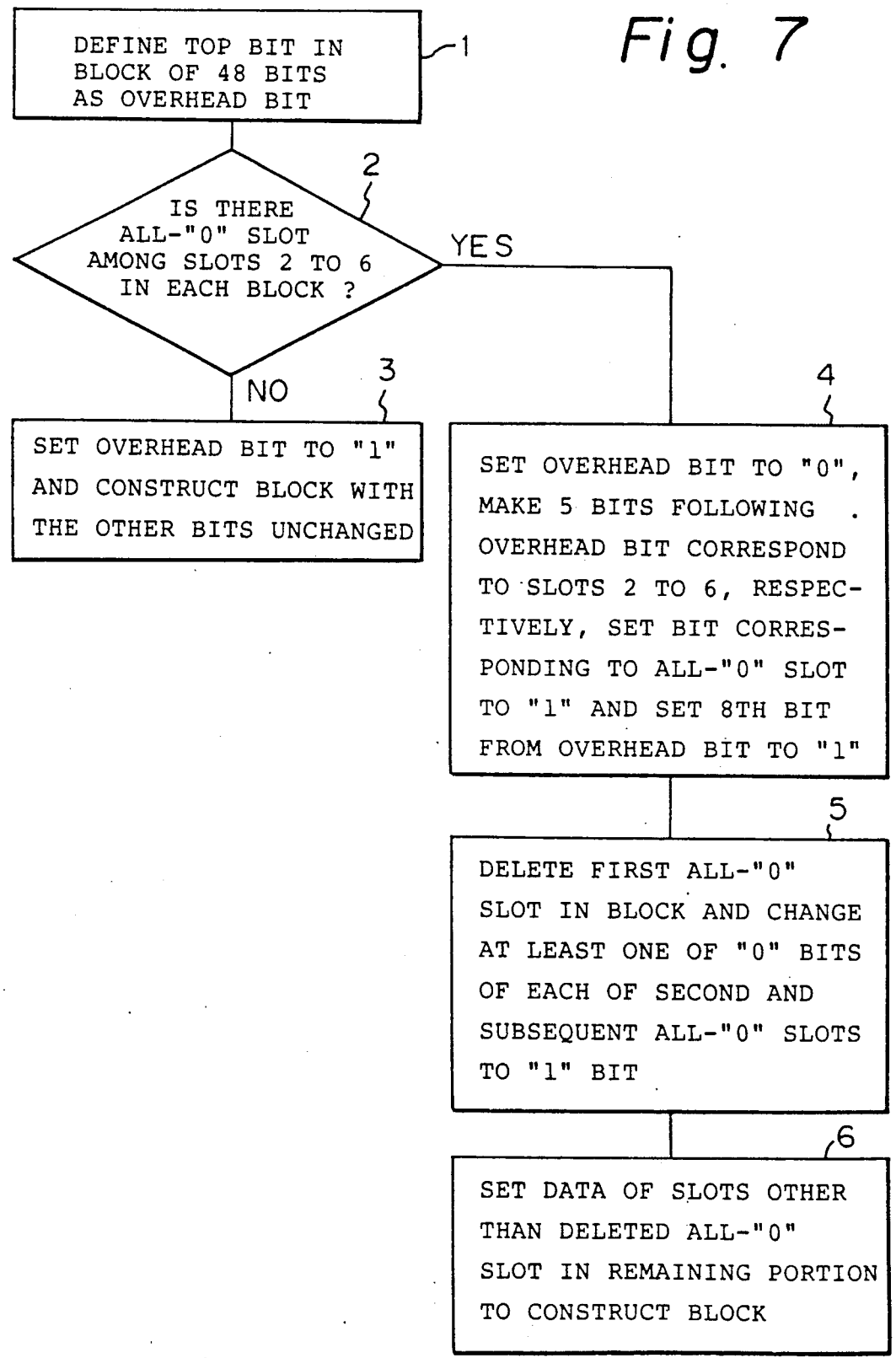
FIG. 7 is a flowchart showing the encoding procedure according to a second embodiment of the transmission line encoding/decoding system according to the present invention.

In the second embodiment, the encoding process is carried out irrespective of whether or not slot 1 is an all-"0" slot, as shown in Step 2 of FIG. 7. However, slot 1 may also be subjected to the judgement as to whether or not it is an all-"0" slot in the same way as in the case of the other slots. FIG. 16 shows the data arrangement in the case where slot 1 is also subjected to the judgement and judged to be an all-"0" slot.

Although in the second embodiment a slot information bit that corresponds to an all-"0" slot is set to "1" as shown in FIGS. 9(c) and 9(d), the arrangement may be such that a bit corresponding to an all-"0" slot is set to "0" and a bit corresponding to a non-all-"0" slot is set to "1", as shown in FIG. 17.

In this case, however, the last 2 bits of the 3 bits following the 5 bits, that is, bit 8 in the first slot and bit 1 in the second slot, must be fixed to "1".

Although in the second embodiment the second bit of the "0" bits in an all-"0" slot is changed to a "1" bit, another "0" bit or a plurality of "0" bits may be changed to "1" bits. It is also possible to send some information utilizing the position of the all-"0" slot by use of a code which inevitably contains at least one "1" bit, that is, any code exclusive of a code all the bits of which are "0". In this case also, the data before the encoding process is reconstructed by setting "0" to all the bits in the slots indicated by the slot information bits.

Thus, according to the second embodiment, an overhead bit that indicates whether or not there is at least one all-"0" slot is set in each block, and if there are all-"0" slots, slot information bits each indicating whether or not the corresponding slot is an all-"0" slot are set in the block in place of the "0" bits of a predetermined all-"0" slot and at least one of the "0" bits of each of the remaining all-"0" slots is changed to a "1" bit. By virtue of this encoding system, it is possible to prevent "0" bits from being delivered in series over a predetermined number while transmitting the position of each all-"0" slot to the receiving side. Since "0" bits are reconstructed at the respective positions of all-"0" slots on the basis of the slot information bits, the all-"0" slots are accurately reconstructed and there is no lowering of the channel occupancy ratio in the data transmission.

Figure 18:
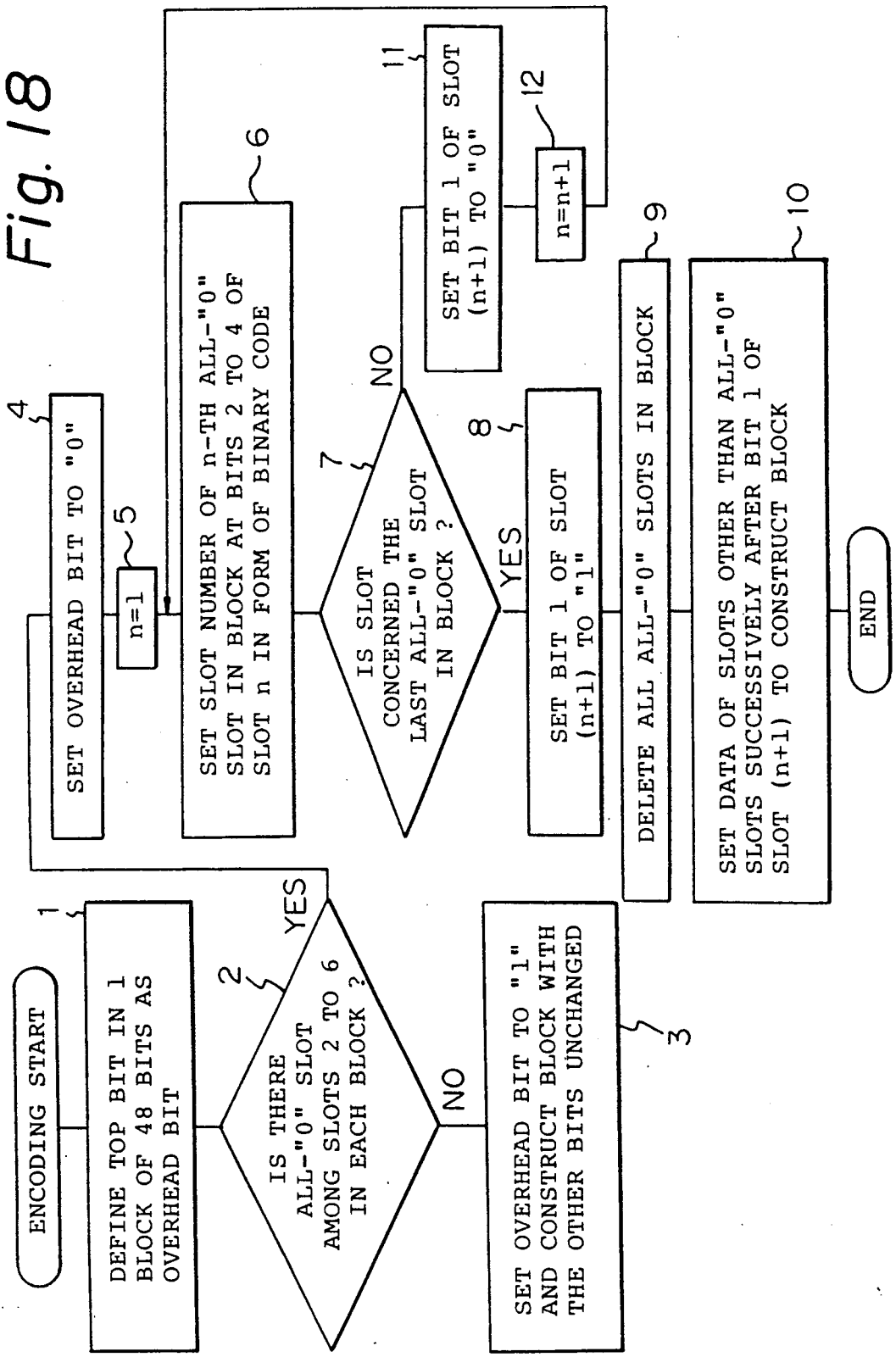
FIG. 18 is a flowchart showing the encoding procedure according to a third embodiment of the transmission line encoding/decoding system according to the present invention.

The following is a description of a third embodiment of the present invention designed to satisfy the same limiting conditions as those described above. The encoding procedure will first be explained with reference to FIG. 18. Since the processings carried out in Steps 1 to 3 in the flowchart are the same as those in Steps 1 to 3 shown in FIG. 1, description thereof is omitted.

When it is judged in Step 2 that there is at least one all-"0" slot among the slots 2 to 6, the overhead bit is set to "0" in Step 4, as shown in FIG. 20(d). It should be noted that FIG. 20(d) shows a case wherein the slots 3 and 5 are all-"0" slots. Next, the initial value of a parameter n which indicates the ordinal number in the block of the all-"0" slot being processed is set to "1" in Step 5. Next, as slot information bits indicating the position of the n-th all-"0" slot in the block, the slot number of the all-"0" slot is formed into a binary code and this code is set at the bits 2 to 4 of the slot n after the encoding process in Step 6. According to the example shown in FIG. 20(d), the slot number '3' of slot 3, which is the first all-"0" slot in the block, is expressed by a binary code using binary numbers, i.e., (0, 1, 1), and this code is set at the bits 2 to 4 in slot 1. Next, it is judged in Step 7 whether or not the all-"0" slot being processed is the last all-"0" slot in the block. If YES is the answer, the process proceeds to Step 8, whereas, if it is judged that the slot is not the last all-"0" slot, the process proceeds to Step 11. In the example shown in FIG. 20(d), since there is another all-"0" slot after slot 3, that is, slot 5, the process proceeds to Step 11. In Step 11, bit 1 in the slot (n+1) after the encoding process is set to "0". In the example shown in FIG. 20(d), bit 1 in slot 2 is set to "0". As is shown in FIG. 20(d), the first 8 bits following the overhead bit are data bits set in place of the 8 "0" bits of slot 3, and the binary code (0, 1, 1) comprising the first 3 bits of the 8 bits represents the slot number '3' of slot 3, while the last one "0" bit indicates that there is another all-"0" slot after slot 3. More specifically, the fact that bit 1 in slot 2 is "0" reveals that the 8 bits following it do not carry transmitted data but binary-coded information set in place of a subsequent all-"0" slot. It should be noted that the bits 5 to 8 in slot 1 may be set to either "1" or "0". Next, the value of the parameter n which indicates the ordinal number in the block of the all-"0" slot being processed is incremented by one in Step 12 and the process returns to Step 6. In the example shown in FIG. 20(d), the processing of slot 3, which is an all-"0" slot, is completed and the processing of slot 5, which is a subsequent all-"0" slot, is initiated. In Step 6, the slot number '5' of slot 5, which is the second all-"0" slot in the block, is expressed by a binary code (1, 0, 1) and this code is set at the bits 2 to 4 in slot 2. Since it is judged in the following Step 7 that slot 5 being processed is the last all-"0" slot in the block, the process proceeds to Step 8, in which bit 1 in the slot (n+1) is set to "1". According to the example shown in FIG. 20(d), the 8 bits, that is, from bit 2 of slot 2 to bit 1 of slot 3 after the encoding process, are data bits set in place of the 8 "0" bits of slot 5 before the encoding process and the fact that the last bit, that is, bit 1 of slot 3, is "1" reveals that slot 5 is the last all-"0" slot in the block and bit 2 of slot 3 after the encoding process and the data bits following it are transmitted data bits which have not been changed at all. Next all the all-"0" slots in the block are deleted in Step 9. More specifically, since information that indicates the positions of all-"0" slots in the block have already been set before Step 9, transmission of the information enables the receiving side to reconstruct the all-"0" slots at their respective positions before the encoding process; therefore, the 8 "0" bits of each all-"0" slot, which have become unnecessary to be transmitted, are deleted in Step 9. Finally, the data of the slots except for the all-"0" slots is set at bit 2 of the slot (n+1) and the bits following it, that is, after the (8×n) bits following the overhead bit where information about all-"0" slots has been set. FIG. 20(d) shows the data arrangement for one block after the encoding process in which slots 3 and 5, which are all-"0" slots, are deleted and the other data bits are successively set at bit 2 of slot 3 and the bits following it. Slots 1, 2, 4 and 6 before the encoding process are set in slots 3, 4, 5 and 6, respectively, of the block after the encoding process.

In the block after the encoding process, as shown in FIG. 20(d), there is no possibility of all the 8 bits of slot 1 being "0" because of the presence of "1" bits in the binary code (0, 1, 1) indicating slot 3 and there is no possibility of all the 8 bits of slot 2 being "0" because of the presence of the "1" bits in the binary code (1, 0, 1) indicating slot 5. In addition, at least one "1" bit is inevitably contained in any series of 16 bits. Since the slots that are subjected to the all-"0" slot processing are slots 2 to 6, there is no possibility that the binary code indicating a slot number will be (0, 0, 0) and there is therefore no fear of an all-"0" slot being generated as a result of the encoding process.

Since in slots 3 to 6 shown in FIG. 20(d) are respectively set slots other than all-"0" slots in the block before the encoding process, no all-"0" slot is contained therein. Accordingly, it is not possible that any of the slots 1 to 6 after the encoding process, shown in FIG. 20(d), and the 8 bits thereof will be "0". Thus, it is possible to satisfy the above-described "0" series limiting conditions.

According to the encoding system described above, it is possible to minimize the number of overhead bits needed in one frame in order to satisfy the limiting conditions concerning a series of "0" bits. In comparison between the third embodiment and the aforementioned conventional bit stuffing system, for example, it is possible according to this embodiment to reduce the number of overhead bits required to one sixth of that in the case of the prior art.

Since the overhead bit is set in a predetermined slot within one block, the length of one block including the overhead bit just corresponds to an integral multiple of the number of bits constituting one slot, i.e., 8. Therefore, in a case where the number of data bits exclusive of the frame bit in a frame format of a transmission line such as that shown in FIGS. 20(a) and 20(b) is an integral multiple of 8, it is possible to effect efficient data transmission using the data bits efficiently without any waste. The same advantageous effect is obtained in any case where the number of data bits in one frame is an integral multiple of a predetermined number of bits even if the frame format is different from that shown in FIGS. 20(a) and 20(b).

Figure 19:
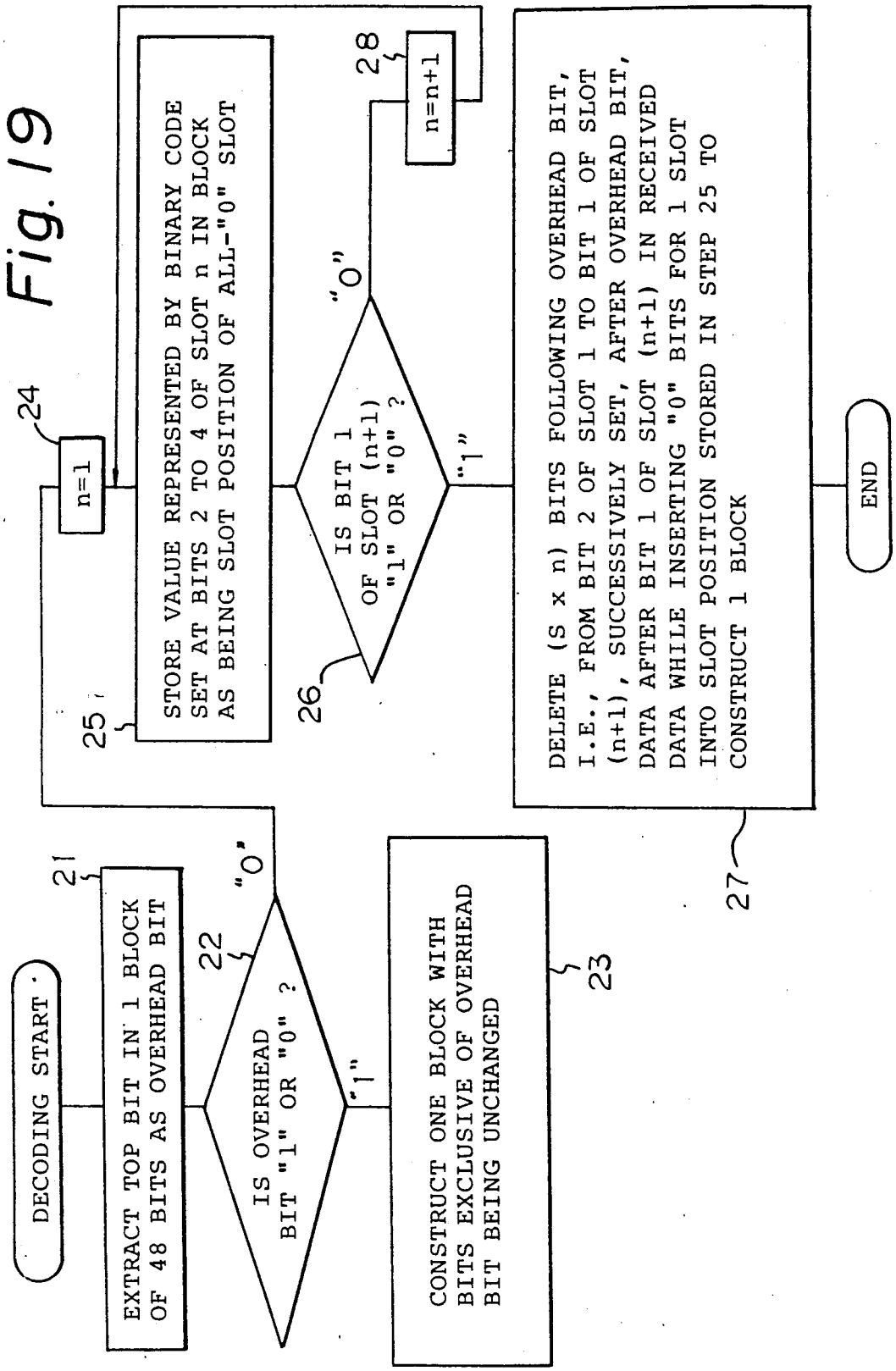
FIG. 19 is a flowchart showing the decoding procedure according to the third embodiment.

The decoding procedure will next be explained with reference to the flowchart shown in FIG. 19 by way of one example in which the decoding process is applied to the received data having an encoded data format such as that shown in FIG. 20(d). First, the top bit in one block (48 bits) of the received data is extracted as being an overhead bit in Step 21, and it is judged in Step 22 whether the overhead bit is "1" or "0". If "1" is the answer, it means that there was no all-"0" slot in the block before the encoding process. Therefore, the process proceeds to Step 23, in which the bits except for the overhead bit are used as data bits without being changed to construct one block. If the overhead bit is judged to be "0" in Step 22, it means that there was at least one all-"0" slot in the block before the encoding process. Therefore, the process proceeds to Step 24, in which the initial value of a parameter n which indicates the ordinal number in the block of the all-"0" slot being processed is set to 1.

Next, a value represented by the binary code set at the bits 2 to 4 of the slot n in the block, that is, the value corresponding to the slot number of the n-th all-"0" slot in the block before the encoding process, is stored in memory in Step 25. According to the example shown in FIG. 20(d), the slot number represented by the binary code (0, 1, 1) set at the bits 2 to 4 of slot 1 is '3' and this reveals that the first all-"0" slot in the block before the encoding process is slot 3; therefore '3' is stored in memory.

Next, it is judged in Step 26 whether bit 1 of the slot (n+1) is "1" or "0" to make a judgement as to whether or not the all-"0" slot being processed is the last all-"0" slot in the block concerned. If bit 1 of the slot (n+1) is judged to be "0" in Step 26, it means that there is another all-"0" slot in the block, and the process proceeds to Step 28. If bit 1 of the slot (n+1) is judged to be "1" in Step 26, it means that there is no more all-"0" slot in the block, and the process proceeds to Step 27. If n=1 in the example shown in FIG. 20(d), then bit 1 of slot 2 is judged to be "0" in Step 26; therefore, the process proceeds to Step 28. In Step 28, the value of the parameter n that indicates the ordinal number in the block of the all-"0" slot being processed is incremented by one, and the process returns to Step 25 and then proceeds to Step 26 again. In the example shown in FIG. 20(d), n=2 in Step 28, and the value represented by the binary code (1, 0, 1) set at the bits 2 to 4 of slot 2, that is, the value '5' corresponding to slot 5 which is the second all-"0"

slot in the block before the encoding process, is stored in memory in Step 25.

Next, since bit 1 of slot 3 is judged to be "1" in Step 26, it is found that there is no more all-"0" slot in the block concerned, and the process proceeds to Step 27. In Step 27, the bit section where a binary code representative of the position of an all-"0" slot and other information have been set, that is, the $(8 \times n)$ bits following the overhead bit, i.e., from bit 2 of slot 1 to bit 1 of the slot $(n+1)$, are deleted and the data bits following bit 1 of the slot $(n+1)$ are successively set after the overhead bit, thereby reconstructing one block. It should be noted that, while the data bits are successively set, 8 "0" bits are inserted into each of the slot positions indicated by the values stored in Step 25. According to the example shown in FIG. 20, 16 bits in the received data shown in FIG. 20($d$), that is, from bit 2 of slot 1 to bit 1 of slot 3, are deleted, and the data bits following bit 1 of slot 3, that is, from bit 2 of slot 3 to bit 8 of slot 4, are set after the overhead bit. At this point, setting of data in the block being reconstructed has been completed as far as the position immediately in front of slot 3 indicated by the value stored in Step 25 and 8 "0" bits are then set. Subsequently thereto, slot 5 of the received data is set and 8 "0" bits are set again at the position of slot 5 in the block being reconstructed. Subsequently thereto, the remaining received data is set to finish the reconstruction of one block, thus completing the decoding process.

The encoder and decoder explained in connection with FIGS. 4 to 6 may also be employed to realize the encoding and decoding systems of the third embodiment. However, the "0" substituting circuit 31 in the decoder shown in FIG. 5 inserts, when there is at least one all-"0" slot, "0" bits for one slot into the position of the all-"0" slot on the basis of the slot information bits set in the block and deletes this binary code, thereby reconstructing the row of data before the encoding process.

Figure 20:
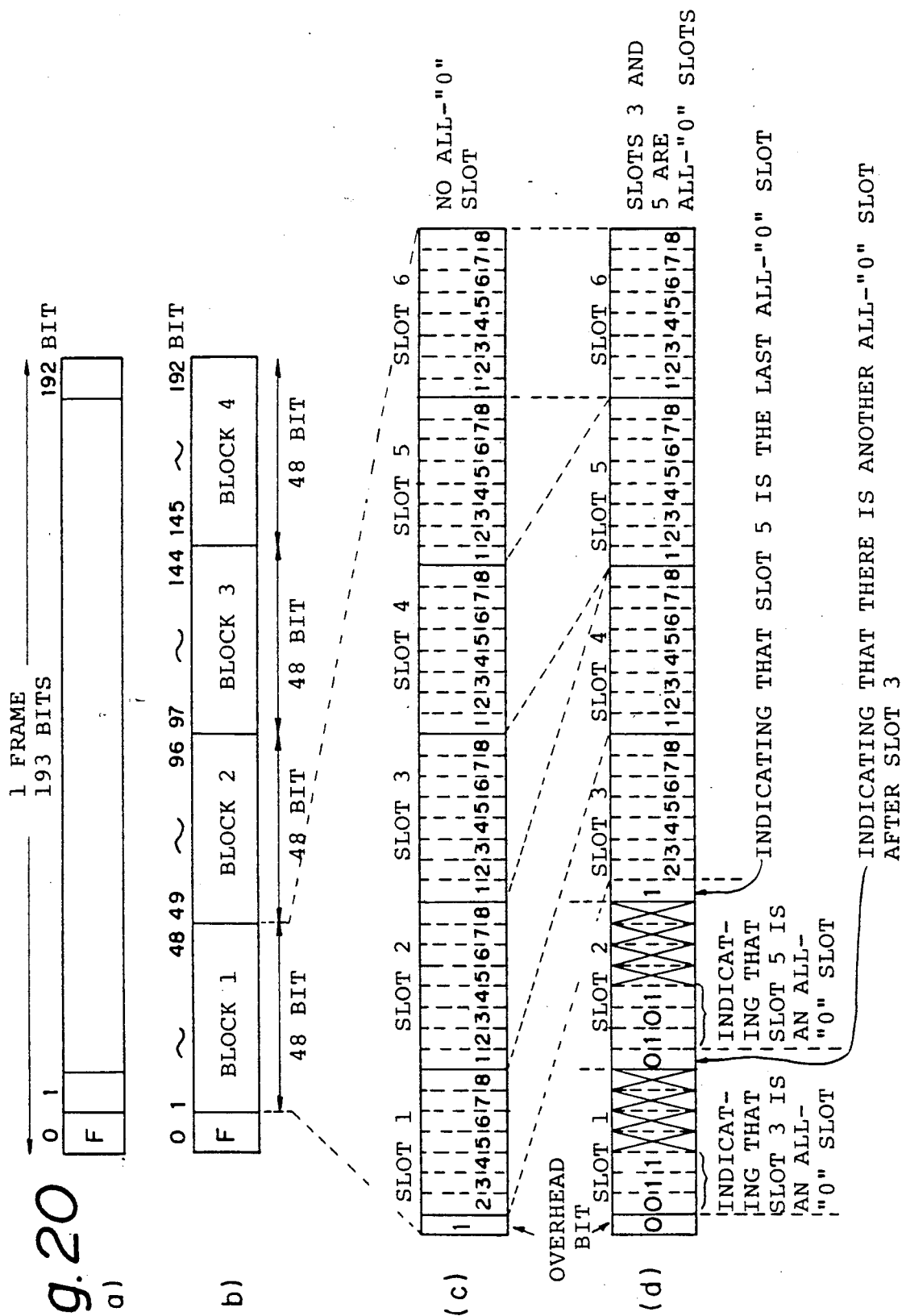
FIG. 20 shows the arrangement of data encoded and decoded by the processing procedures according to the third embodiment.

The feature of the encoder according to the third embodiment resides in the operation of the all-"0" slot containing frame forming circuit 17. The circuit 17 sets the top bit in slot 1 to "0", as shown in FIG. 20($d$) which illustrates the data arrangement of one block in the case where there is at least one all-"0" slot. When each of the slots 2 to 6 is judged to be a slot all the 8 bits of which are "0", that is, an all-"0" slot, on the basis of the output signal 24 from the all-"0" slot judging circuit 15, the circuit 17 sets a binary code representative of the slot number of the all-"0" slot in the slot following the overhead bit but does not write in the block the data bits constituting the all-"0" slot, that is, the output of the register 14 that corresponds to the all-"0" slot, as shown in FIG. 20($d$). When the slot concerned is not an all-"0" slot, the circuit 17 successively sets the data bits constituting the slot, that is, the output of the register 14, in the slot following the slot in which the binary code has been set.

The feature of the decoder according to the third embodiment resides in the operation of the "0" substituting circuit 31. The circuit 31 decodes encoded data containing at least one all-"0" slot, such as that shown in FIG. 20($d$). The circuit 31 first interprets the contents of the bits 2 to 4 in slot 1 of the block in the received data as the slot number of a first all-"0" slot and inserts 8 "0" bits into the position of the slot indicated by the slot number. Thereafter, if bit 1 of slot 2 is "1", the circuit 31 finishes the operation of reconstructing this all-"0" slot, whereas, if bit 1 of slot 2 is "0", the circuit 31 performs reconstruction of the subsequent all-"0" slot with reference to the following bits 2 to 4 of slot 2. In this way, the circuit 31 repeats the all-"0" slot reconstructing operation until bit 1 of the slot $(n+1)$ is judged to be "0". After bit 1 has been judged to be "0" and the reconstruction of all the all-"0" slots has been completed, the circuit 31 deletes a series of bits, that is, from bit 2 of slot 1 to bit 1 of the slot $(n+1)$ where the all-"0" slot information has been set, and then successively sets the data bits following bit 1 of the slot $(n+1)$ in the slots exclusive of the reconstructed all-"0" slots in such a manner that these data bits follow the overhead bit, thereby reconstructing data in the block before the encoding process. The circuit 31 then outputs the reconstructed data to the selector circuit 32.

Figure 21:
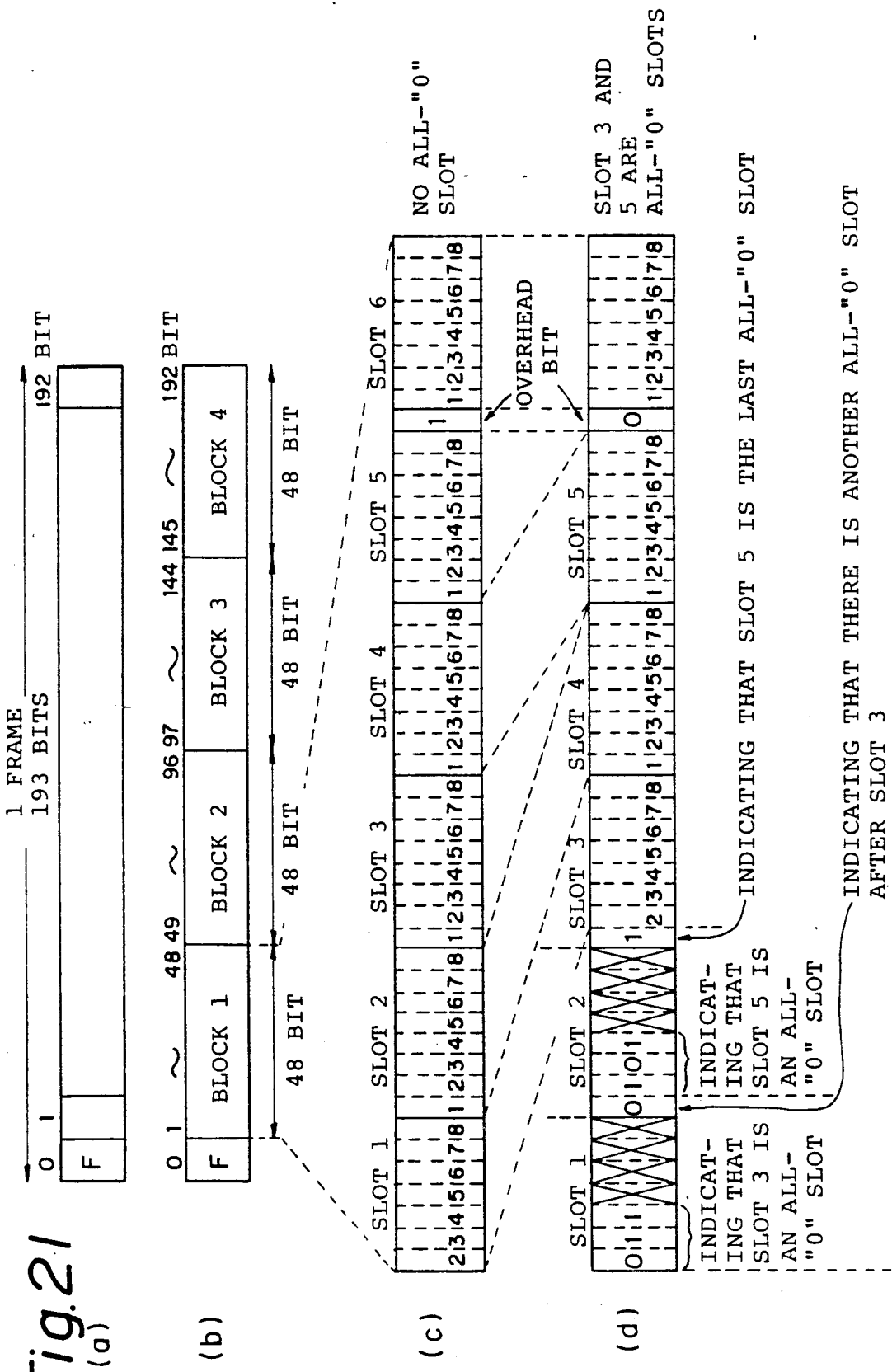

Although in the third embodiment the overhead bit is disposed at the top of each block comprising 48 bits, as shown in FIGS. 20($c$) and 20($d$), it should be noted that it may be disposed at another position in the block, as shown in FIGS. 21($c$) and 21($d$).

Figure 22:
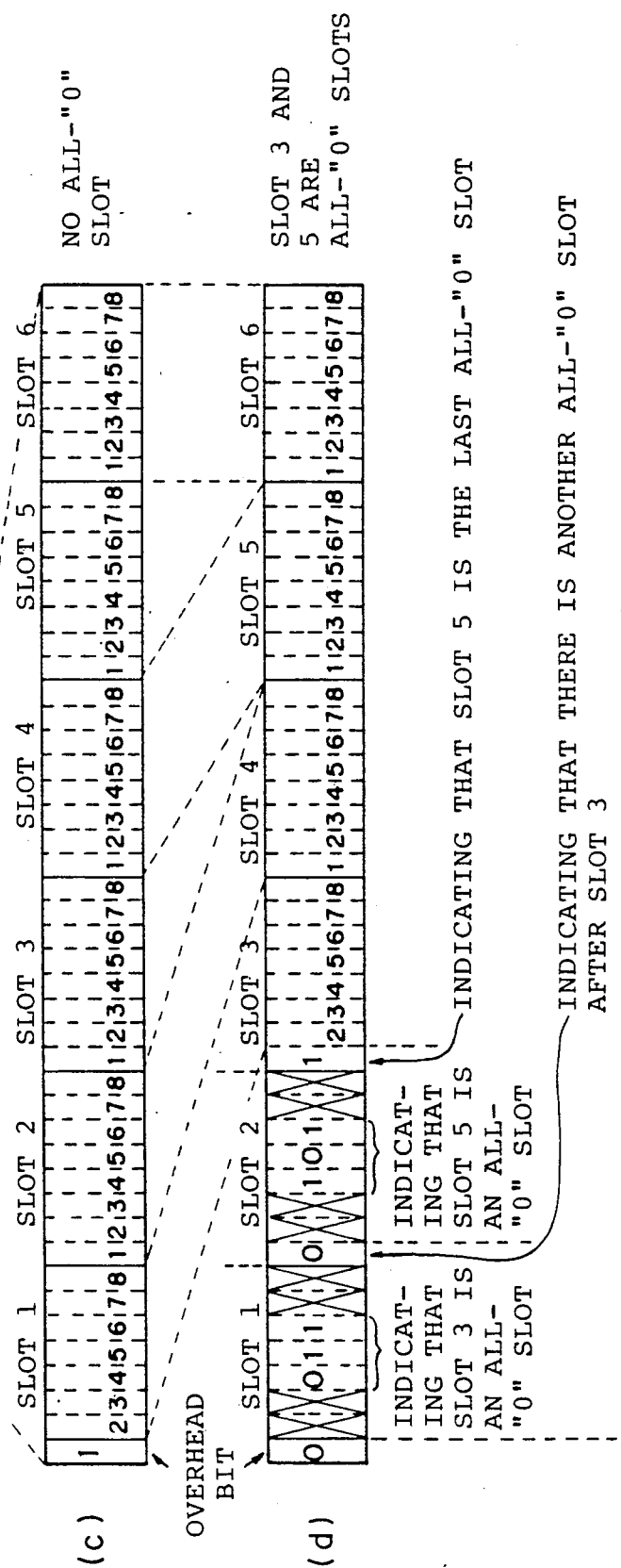

In the third embodiment, the slot number of the n-th all-"0" slot in the block is binary-coded and this binary code is set at the bits 2 to 4 of the slot n, as shown in FIGS. 20($c$) and 20($d$). However, the binary code may be set at other bits, for example, the bits 4 to 6 of the slot n, as shown in FIGS. 22($c$) and 22($d$).

In the third embodiment, the binary code representative of the slot number of an all-"0" slot is an expression of the slot number itself by binary numbers, as shown in FIG. 20($d$), and the relationship between the binary codes and the corresponding slot numbers is such as that shown in FIG. 23($a$). However, the relationship between the binary codes and the corresponding slot numbers is not necessarily limited to the illustrated one. For example, the binary codes and the slot numbers may have a one-to-one correspondence to each other, as shown in FIG. 23($b$). In this case, if the binary code (0, 0, 0) is employed, there may be a case where all the bits of a slot containing the binary code are "0" after the encoding process; therefore, it is necessary to avoid the use of the binary code (0, 0, 0).

In the third embodiment, the data of one frame comprising 193 bits is divided into four blocks each comprising 48 bits, that is, 6 slots, as shown in FIG. 20. However, if the bits denoted by the mark x in FIG. 20($d$) are effectively utilized, it is possible to comprise one block of up to 128 slots, that is, 1,024 bits, as shown in FIG. 24. The reason for this is as follows. When a binary code representative of the slot number of an all-"0" slot is set in place of the 8 "0" bits of the all-"0" slot, together with information indicating whether or not the all-"0" slot is the last all-"0" slot in the block, 7 bits, that is, 8 bits minus one for the information indicating whether or not the all-"0" slot is the last all-"0" slot in the block, can be used to form a binary code representative of the slot number of the all-"0" slot and it is therefore possible to indicate up to $2^7 = 128$ slots. By so doing, it suffices to provide only one overhead bit per block and hence per 128 slots. Accordingly, it is possible to satisfy the above-described "0" series limiting conditions with a number of overhead bits which is smaller than in the case of the foregoing embodiment.

Figure 26:
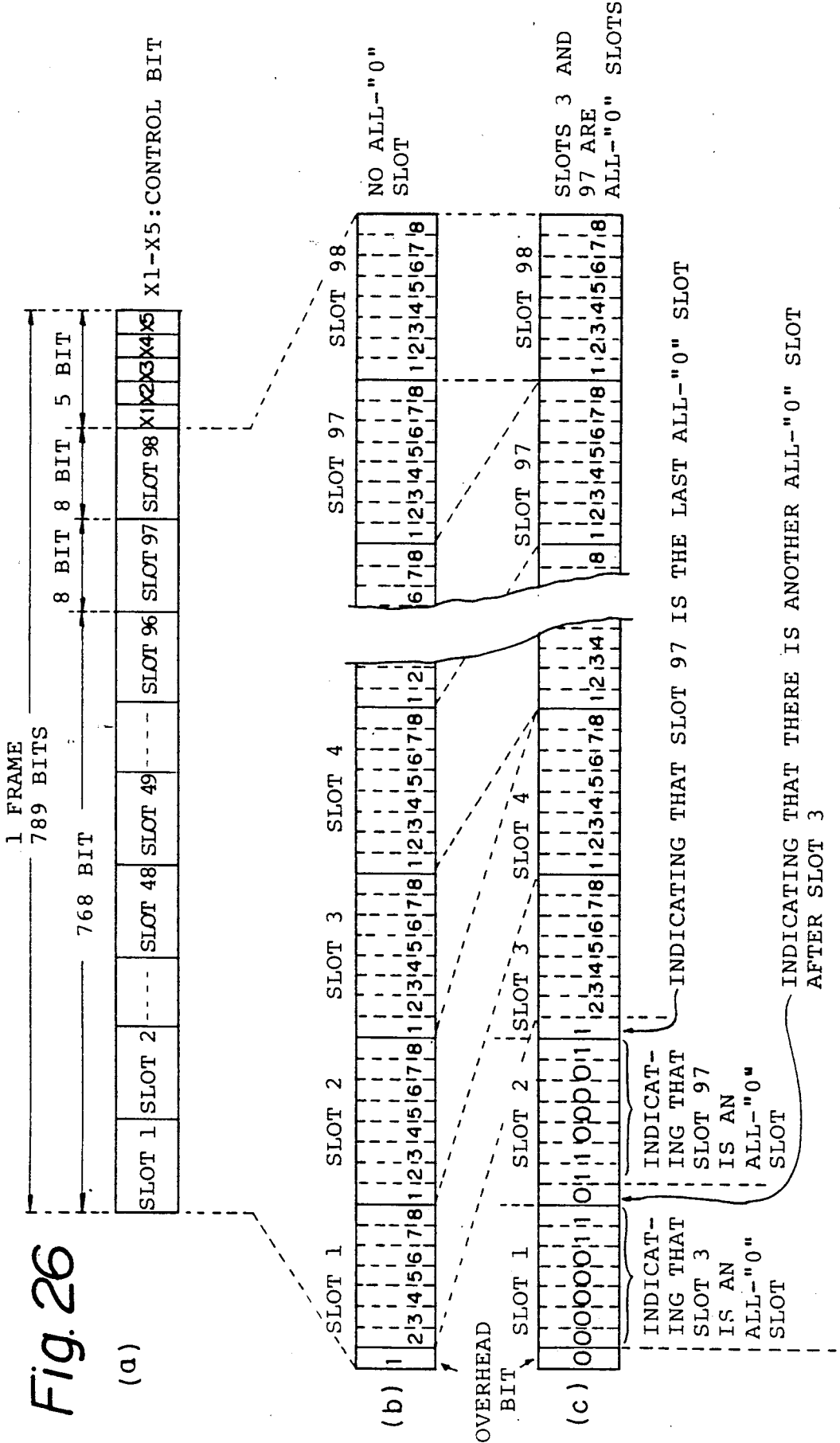

In application of the foregoing arrangement to an actual frame format, the frame comprising 193 bits that is employed for T1 circuit in U.S.A. can be defined as one block, as shown in FIG. 25. In addition, the frame comprising 789 bits that is employed for T2 circuit in U.S.A. can also be defined as one block, as shown in FIG. 26. In either case, the above-described "0" series limiting conditions can be satisfied with only one overhead bit.

Figure 27:
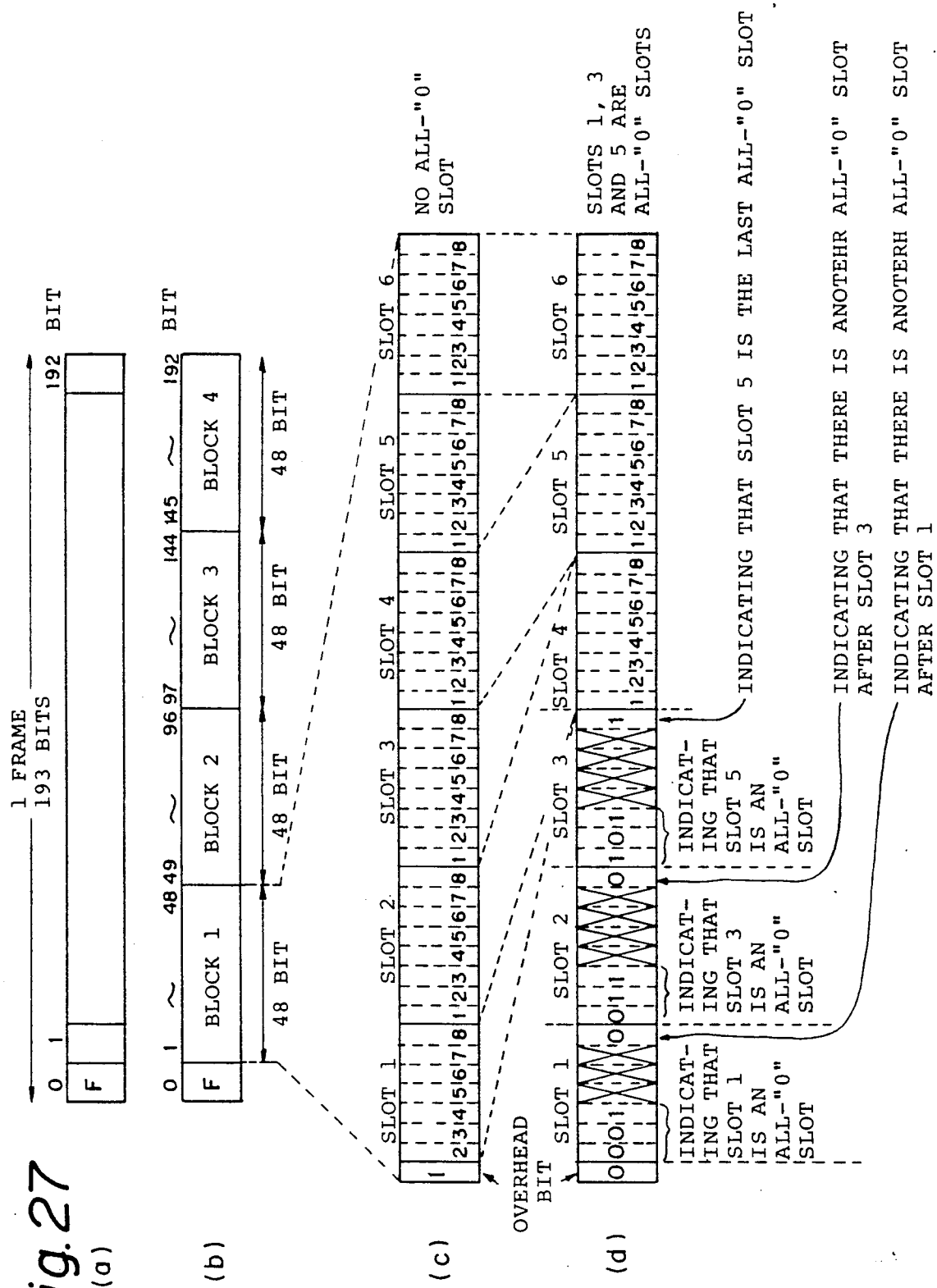
Figure 28:
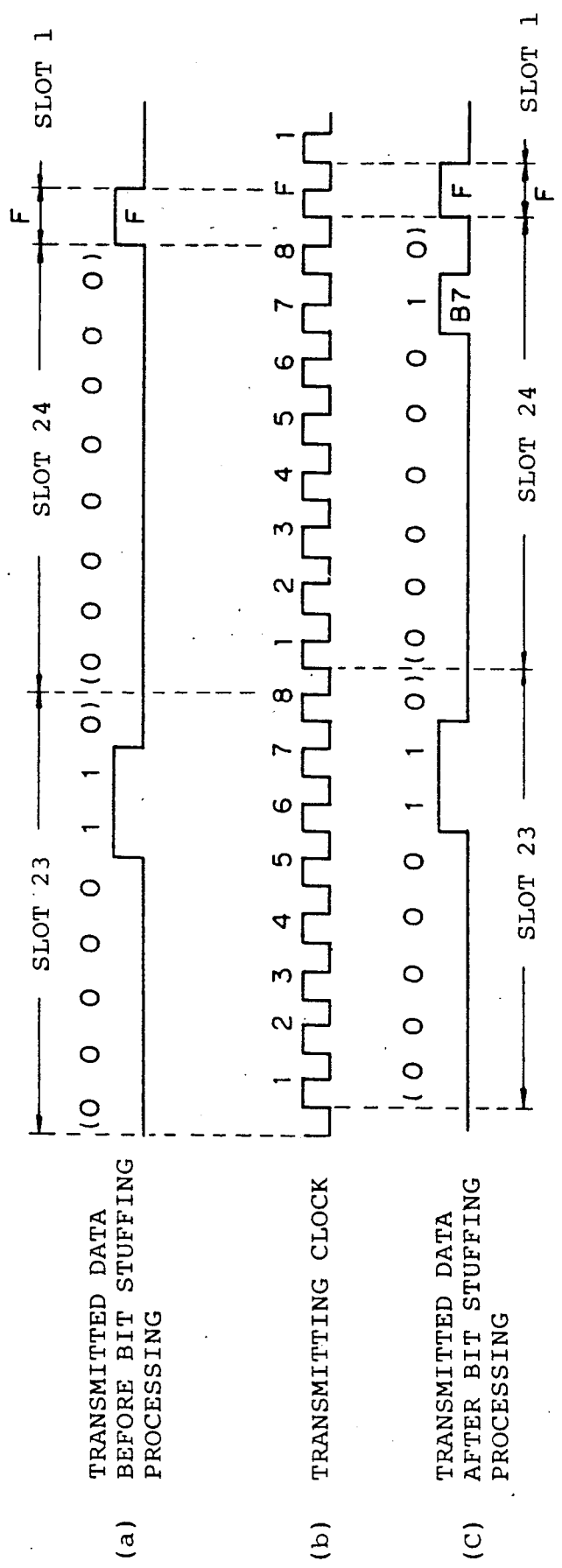
FIG. 28 shows the arrangement of data in a conventional transmission line encoding/decoding system.

In the third embodiment, the overhead bit is contained in slot 1, as shown in FIG. 20(d), and even if the other bits of slot 1 are all "0", the overhead bit prevents "0" bits from being delivered in series over a predetermined number. For this reason, slot 1 is not subjected to the judgement as to whether or not it is an all-"0" slot, as shown at Step 2 shown in FIG. 18. However, slot 1 may be subjected to the all-"0" slot judging process. FIG. 27 exemplarily shows the arrangement of encoded data in the case where slot 1 is subjected to the all-"0" slot judging process and it is judged to be an all-"0" slot.

Although in the third embodiment binary codes are employed as slot information bits indicating the respective positions of all-"0" slots, the arrangement may, for example, be such that a number of bits which is the same as the number of slots constituting one block are prepared as slot information bits and arranged to correspond to the slots, respectively, so as to indicate whether each slot is an all-"0" slot or not by "1" or "0" and the slot information bits corresponding to all the all-"0" slots are set in place of the all-"0" slots. In this case, a number of identical slot information bits which is the same as the number of all-"0" slots are redundantly transmitted and transmission of an excess number of "0" bits in series is prevented by the slot information bits.

Thus, according to the third embodiment, an overhead bit indicating whether or not there is at least one all-"0" slot in a block is set in a predetermined slot of the block, and if there are all-"0" slots, slot information bits indicating the respective positions of the all-"0" slots are set in place of the all-"0" slots, thereby encoding data to be transmitted. Therefore, it is possible to inform the receiving side of the respective positions of the all-"0" slots by the slot information bits and hence possible to accurately reconstruct the all-"0" slots. In addition, since the presence of the slot information bits prevents transmission of an excess number of "0" bits in series, it is possible to completely effect transparent data transmission at a high transmission efficiency while preventing transmission of an excess number of "0" bits in series.

The present invention may be effectively applied not only to the frame formats shown in the foregoing embodiments but also to other transmission lines which involve limitations concerning the transmission of "0" bits in series. In the application of the present invention, the length of each block and other factors will depend on the number of bits constituting one frame and the number of "0" bits allowed to be transmitted in series.

What is claimed is:

1. A transmission line encoding system comprising:
means for setting an overhead bit indicating whether or not there is at least one all-"0" slot, which is a slot all the bits of which are "0" bits, among a plurality of slots constituting in combination one block having a predetermined data length in said block; and
means for setting, when there is at least one all-"0" slot, a slot information bit indicating the position of at least one all-"0" slot and deleting at least one all-"0" slot the position of which is indicated by said slot information bit.

2. A transmission line decoding system comprising:
means for judging whether or not there was an all-"0" slot in a received block having a predetermined data length before it was encoded on the basis of an overhead bit set at a predetermined position in the received block; and
means for reconstructing, when it is judged that there was an all-"0" slot, an all-"0" slot at the position designated by a slot information bit set in said received block.

3. A transmission line encoding system comprising:
means for setting an overhead bit indicating whether or not there is an all-"0" slot, which is a slot all the bits of which are "0", among a plurality of slots constituting in combination one block having a predetermined data length in said block; and
means for setting, when there are all-"0" slots, slot information bits indicating the respective positions of the all-"0" slots in said block at a predetermined position in said block in place of a predetermined one of said all-"0" slots and changing the other all-"0" slots into slots each having at least one "1" bit.

4. A transmission line encoding system comprising:
means for setting an overhead bit indicating whether or not there is an all-"0" slot, which is a slot in which all the bits are "0", among a plurality of slots constituting, in combination, a block having a predetermined data length; and
means for setting, at a predetermined position in said block, a binary code representing the slot number of one all-"0" slot, the positional relationship of said one all-"0" slot among other all-"0" slots being predetermined, and for deleting the "0" bits of said one all-"0" slot, and dispersing "1" bits at predetermined intervals throughout other of said plurality of slots in the block to prevent a continuous sequence "0" bits from exceeding fixed number, the predetermined length of said block remaining constant.

5. A transmission line decoding system comprising:
means for judging whether or not there was an all-"0" slot in a received block having a predetermined data length before it was encoded on the basis of an overhead bit set at a predetermined position in the received block; and
means for removing, when it is judged that there was at least one all-"0" slot, "1" bits dispersed at predetermined intervals in said block, for inserting an all-"0" slot at a position indicated by a binary code contained within said block, and for removing said binary code.

6. A transmission line encoding system comprising:
means for reserving an overhead bit at a predetermined position in a predetermined slot, said slot being one of a plurality of slots constituting, in combination, a block having a predetermined data length;
means for identifying an all-"0" slot, which is a slot in which all the bits are "0", among a plurality of slots constituting, in combination, said block having a predetermined data length;
means for setting the overhead bit to "0", when there is at least one all-"0" slot, indicating that there is at least one all-"0" slot, among said plurality of slots in the block, except when all bits of said predetermined slot are "0", exclusive of the overhead bit;
means for setting the overhead bit to "1", when there are no all-"0" slots, indicating that there are no all-"0" slots among said plurality of slots in the block, excluding said predetermined slot; and means for setting the overhead bit to "1", when all the bits of said predetermined slot are "0" except for the overhead bit, indicating that there are no other all-"0" slots among said plurality of slots in the block.

7. A transmission line decoding system comprising:

means for judging whether or not there was an all-"0" slot in a received block having a predetermined data length before it was encoded on the basis of an overhead bit set at a predetermined position in the received block;

means for passing the received block transparently, when the overhead bit is set to "1", indicating that there are no all-"0" slots in the received block; and means for replacing, when the overhead bit is set to "0", indicating that there was at least one all-"0" slot in the received block, slot information bits corresponding to each all-"0" slot that existed before coding, with the corresponding all-"0" slots, in accordance with the slot information bits.

8. A transmission line encoding/decoding system comprising:

means for setting an overhead bit indicating whether or not there is at least one all-"0" slot, which is a slot all the bits of which are "0" bits, among a plurality of slots constituting in combination one block having a predetermined data length in said block;

means for setting, when there is at least one all-"0" slot, a slot information bit indicating the position of at least one all-"0" slot and deleting at least one all-"0" slot the position of which is indicated by said slot information bit;

means for judging whether or not there was an all-"0" slot in a received block having a predetermined data length before it was encoded on the basis of an overhead bit set at a predetermined position in the received block; and means for reconstructing, when it is judged that there was an all-"0" slot, an all-"0" slot at the position designed by a slot information bit set in said received block.

9. A transmission line encoding/decoding system comprising:

means for setting an overhead bit indicating whether or not there is an all-"0" slot, which is a slot all the bits of which are "0", among a plurality of slots constituting in combination one block having a predetermined data length in said block;

means for setting, when there are all-"0" slots, slot information bits indicating the respective positions of the all-"0" slots in said block at a predetermined position in said block in place of a predetermined one of said all-"0" slots and changing the other all-"0" slots into slots each having at least one "1" bit;

means for judging whether or not there was an all-"0" slot in a received block having a predetermined data length before it was encoded on the basis of an overhead bit set at a predetermined position in the received block; and means for removing, when it is judged that there were all-"0" slots, slot information bits set at a predetermined position in said received block, inserting an all-"0" slot at a predetermined one of the all-"0" slot positions designed by the slot information bits to reconstruct a all-"0" slot, and restoring all the bits of the slots corresponding to the other all-"0" slot positions to "0" bits.

* * * * *